US010922423B1

(12) United States Patent
Rungta et al.

(10) Patent No.: US 10,922,423 B1
(45) Date of Patent: Feb. 16, 2021

(54) REQUEST CONTEXT GENERATOR FOR SECURITY POLICY VALIDATION SERVICE

(71) Applicant: Amazon Technologies, Inc., Seattle, WA (US)

(72) Inventors: Neha Rungta, San Jose, CA (US); Kasper Søe Luckow, Sunnyvale, CA (US); Andrew Jude Gacek, Maple Grove, MN (US); Carsten Varming, Brooklyn, NY (US); John Cook, Brooklyn, NY (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 303 days.

(21) Appl. No.: 16/015,114

(22) Filed: Jun. 21, 2018

(51) Int. Cl.
*G06F 21/60* (2013.01)
*G06F 21/44* (2013.01)

(52) U.S. Cl.
CPC ............ *G06F 21/604* (2013.01); *G06F 21/44* (2013.01)

(58) Field of Classification Search
CPC .......... G06F 21/10; G06F 21/62; G06F 21/31; G06F 21/604; G06F 21/44; G06F 21/45; G06F 21/629; G06F 21/6209; G06F 21/6218; G06F 21/6281; G06F 21/6236; G06F 21/6227; H04L 63/10; H04L 63/20; H04L 63/105; H04L 63/083; H04L 63/0876; H04L 63/0263; H04L 63/168; H04L 63/0861; H04L 41/28; H04L 9/3213; H04L 2221/80; H04L 2221/2111;
(Continued)

(56) References Cited

U.S. PATENT DOCUMENTS 8,056,114 B2* 11/2011 Allen .................. G06F 21/6236
726/1
8,655,824 B1* 2/2014 Allen ..................... G06F 21/604
706/47

(Continued)

OTHER PUBLICATIONS

Zhang et al., Context-aware Dynamic Access Control for Pervasive Applications, google.com (Year: 2004).*
(Continued)

*Primary Examiner* — Kambiz Zand
*Assistant Examiner* — Mahabub S Ahmed
(74) *Attorney, Agent, or Firm* — Quarles & Brady LLP

(57) ABSTRACT

A security policy analyzer service of a computing resource service provider performs evaluations of security policies provided by the service provider's users, to determine whether the security policies are valid, satisfiable, accurate, and/or sufficiently secure. The service may compare the user-provided policy to a stored or best-practices policy to begin the evaluation, translating encoded security permissions into propositional logic formulae that can be compared to determine which policy is more permissive. The service determines values of the parameters in a request for access to a computing resource based on the policy comparison, and generates request contexts using the values. The service uses the request contexts to generate one or more comparative policies that are then used iteratively as the second policy in the comparison to the user-provided policy, in order to produce additional request contexts that represent allow/deny "edge cases" along the borders of policy permission statements.

20 Claims, 16 Drawing Sheets

(58) Field of Classification Search
CPC ..... H04L 2221/2113; H04L 2221/2141; H04L 2209/80; H04W 12/0802; H04W 12/00; H04W 12/08; H04W 12/0804
USPC ...................................... 726/1, 4, 17, 22–26
See application file for complete search history.

(56) References Cited

U.S. PATENT DOCUMENTS

| | | | | |
|---|---|---|---|---|
| 9,223,992 | B2* | 12/2015 | Rissanen | G06F 21/604 |
| 9,325,739 | B1* | 4/2016 | Roth | G06F 3/04842 |
| 9,460,308 | B2* | 10/2016 | Sethi | G06F 21/6218 |
| 9,519,799 | B2* | 12/2016 | Asim | G06F 21/6245 |
| 9,646,164 | B2* | 5/2017 | Rissanen | H04L 63/10 |
| 2007/0156659 | A1* | 7/2007 | Lim | H04L 41/0893 |
| 2007/0156691 | A1* | 7/2007 | Sturms | G06F 21/6218 |
| 2007/0156694 | A1* | 7/2007 | Lim | H04L 63/20 |
| 2008/0066147 | A1* | 3/2008 | Dillaway | G06F 21/6236 726/1 |
| 2008/0066160 | A1* | 3/2008 | Becker | G06F 21/62 726/4 |
| 2009/0070853 | A1* | 3/2009 | Chung | G06F 21/604 726/1 |
| 2009/0327908 | A1* | 12/2009 | Hayton | G06F 21/6218 715/744 |
| 2010/0037290 | A1* | 2/2010 | Griffin | G06F 21/6218 726/1 |
| 2010/0042973 | A1* | 2/2010 | Anderson | G06F 8/72 717/120 |
| 2011/0167479 | A1* | 7/2011 | Maes | G06F 21/6281 726/4 |
| 2011/0314549 | A1* | 12/2011 | Song | G06F 21/31 726/25 |
| 2011/0314558 | A1* | 12/2011 | Song | G06F 21/316 726/28 |
| 2012/0017260 | A1* | 1/2012 | Narain | G06F 13/362 726/1 |
| 2012/0054826 | A1* | 3/2012 | Asim | G06F 21/6245 726/1 |
| 2012/0297455 | A1* | 11/2012 | Novak | H04L 63/10 726/4 |
| 2013/0055344 | A1* | 2/2013 | Rissanen | G06F 21/604 726/1 |
| 2013/0081105 | A1* | 3/2013 | Giambiagi | G06F 21/31 726/1 |
| 2013/0114810 | A1* | 5/2013 | Kobayashi | H04L 9/3073 380/47 |
| 2013/0291059 | A1* | 10/2013 | Giambiagi | H04L 63/20 726/1 |
| 2014/0047501 | A1* | 2/2014 | Rissanen | G06F 21/00 726/1 |
| 2014/0075492 | A1* | 3/2014 | Kapadia | H04L 63/102 726/1 |
| 2014/0143891 | A1* | 5/2014 | Adams | G06F 21/6218 726/28 |
| 2014/0359695 | A1* | 12/2014 | Chari | G06F 21/31 726/1 |
| 2015/0082370 | A1* | 3/2015 | Jayaraman | H04L 63/20 726/1 |
| 2015/0082441 | A1* | 3/2015 | Gathala | G06F 21/566 726/25 |
| 2015/0135258 | A1* | 5/2015 | Smith | H04L 63/10 726/1 |
| 2015/0199506 | A1* | 7/2015 | Gouda | G06F 21/41 726/1 |
| 2015/0295939 | A1* | 10/2015 | Rissanen | G06F 21/62 726/1 |
| 2017/0048253 | A1* | 2/2017 | Anton | H04L 63/10 |
| 2017/0093920 | A1* | 3/2017 | Ducatel | H04L 63/20 |
| 2017/0187705 | A1* | 6/2017 | Shim | H04L 63/10 |
| 2018/0007099 | A1* | 1/2018 | Ein-Gil | G06F 9/468 |
| 2018/0069899 | A1* | 3/2018 | Lang | G06F 8/38 |
| 2019/0098056 | A1* | 3/2019 | Pitre | H04L 63/20 |

OTHER PUBLICATIONS

Abi-Char et al., A Dynamic Trust-Based Context-Aware Authentication Framework With Privacy Preserving (Year: 2009).*
Turkmen et al., Formal analysis of XACML policies using SMT (Year: 2017).*
Zhang et al., Dynamic Context Aware Access Control for Grid Applications (Year: 2003).*
Becker et al., A Logic for State-Modifying Authorization Policies (Year: 2007).*
Turkmen et al., Analysis of XACML Policies with SMT (Year: 2014).*
Corradi et al., Context-based Access Control for Ubiquitous Service Provisioning (Year: 2001).*
Shen et al., A Semantic Context-Based Model for Mobile Web Services Access Control (Year: 2011).*

* cited by examiner

REQUEST CONTEXT GENERATOR FOR SECURITY POLICY VALIDATION SERVICE

CROSS-REFERENCE TO RELATED APPLICATIONS

This application is related to U.S. patent application Ser. No. 15/637,227, entitled "SECURITY POLICY ANALYZER SERVICE AND SATISFIABILITY ENGINE," filed on Jun. 29, 2017, and incorporated in its entirety herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private cloud. In a network of hardware computing devices, such as servers that are connected to each other to provide virtual computing resources and services to users of a computing resource service provider, there is great value in ensuring the security of resources and data. Access to resources can be tightly controlled based on many different parameters, such as user credentials, resource attributes, network configurations, and the like. Access rights of users and resources, in the context of a computing resource service provider, may be defined using security policies that specify whether to grant or deny a requesting device access to a computing resource. Network configurations can also have security policies, and/or can otherwise have parameters whose values determine the security of the network.

Access rights may change over time, often necessitating changes in affected security policies. Network controls may similarly change. As the number and types of users, and/or the number and types of accessible computing resources, that are supported in a computer system or computer network expands, it may become increasingly difficult to manage security policies, and to validate that computing resources are being made available with secure network configurations and effective security policies in place.

BRIEF DESCRIPTION OF THE DRAWINGS

Various techniques will be described with reference to the drawings, in which.

DETAILED DESCRIPTION

Figure 1A:
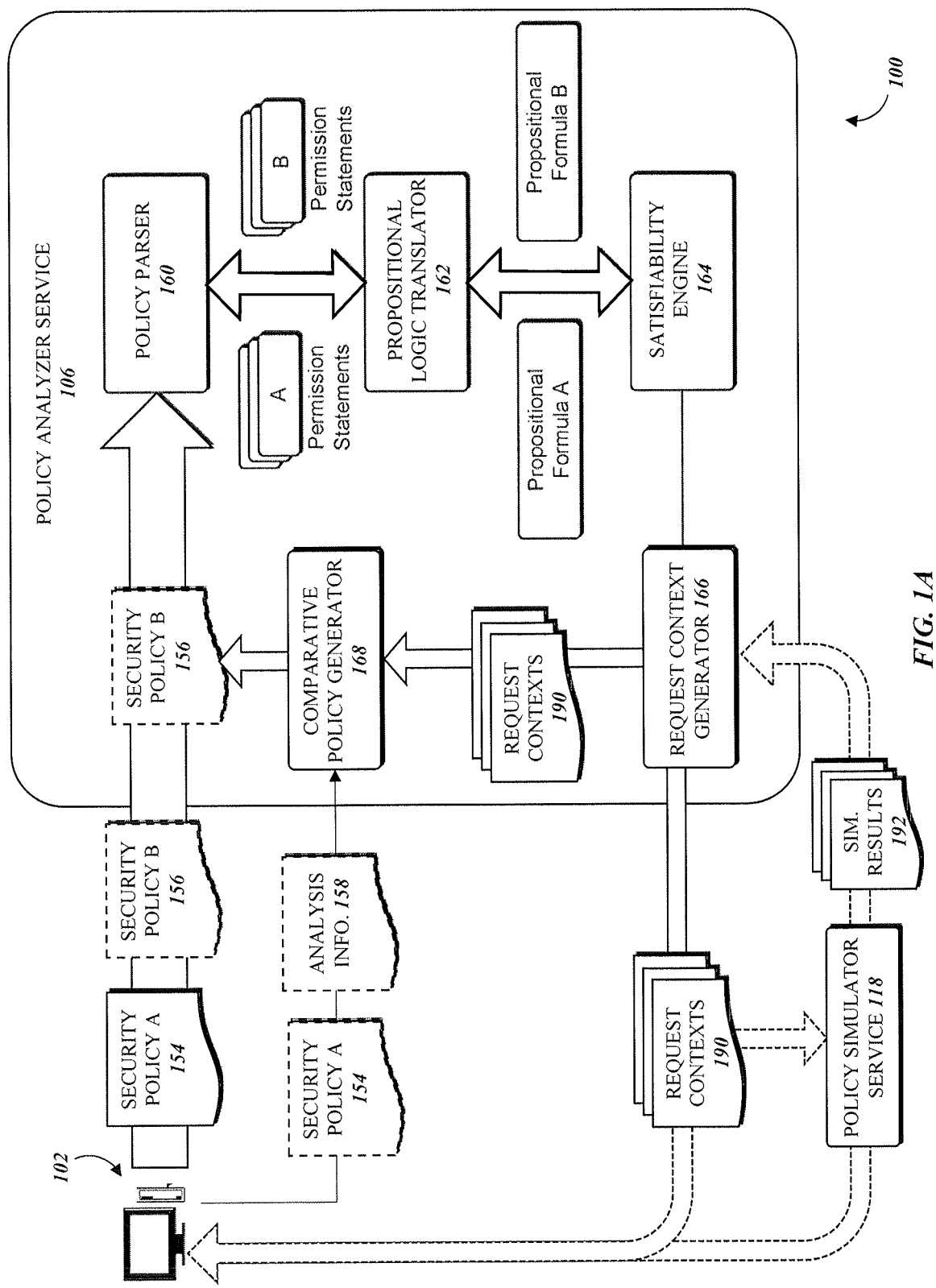
FIGS. 1A-B illustrates a computing environment of a computing resource service provider, in which various embodiments of the present systems and methods can be implemented in accordance with this disclosure.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. Thus, the client may operate and control instances of virtual computing resources, including without limitation: virtual machine instances each emulating a complete computing device having an operating system, processing capabilities, storage capacity, and network connections; virtual machine instances or other containers for performing specific processes; virtual network interfaces each enabling one or more virtual machine instances to use an underlying network interface controller in isolation from each other; virtual data stores operating like hard drives or databases; and the like. The computing resource service provider may provision the virtual computing resources to the client in the client's own virtual computing environment(s), which can be communicatively isolated from the environments of other clients. The computing resource service provider may allow the client to configure its virtual computing resources so they can receive connections from the computing devices of end users; the client's virtual computing resources can provide software applications, web services, and other computing services to the end users.

Virtual computing resources are deployed into a client's virtual computing environment by creating the instance within corresponding resources allocated to the environment, and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks). In various implementations, a client can configure various aspects of the virtual network and its attendant components. These configurations can create security vulnerabilities. For example, a client may configure a virtual network interface to serve as an "endpoint" with a publicly available IP address that end user devices can connect to (e.g., by typing the IP address into a browser program); the configuration may leave certain ports undesirably open to access by an end user device that is looking for open ports. The configuration of the virtual network should therefore be checked for security issues.

Additionally or alternatively, a client may create a security policy and associate the security policy with, for example, a particular end user, a group of end users, a particular virtual computing resource (e.g., a virtual machine instance), a particular type of virtual computing resource, a particular class of virtual computing resources, a computing network, traffic from a geographic area, and the like. Services of the computing resource service provider and/or the client that receive and evaluate requests by end users to access a virtual computing resource may use the security policy to determine whether to grant the requested access to the requesting user. In one example, the client may apply a security policy to a class of virtual computing resources; if the various components of the computing system are configured correctly, instances of the class are deployed with the specified security policy attached thereto (i.e., associated with, and controlling access to, the instance). Such a security policy is said to be a "resource" security policy because it may attach directly to certain resources, and may further be defined within a configuration (e.g., a template) applied to a virtual computing resource at launch. Other security policies may attach to a user account, a user group, access requests having certain characteristics, and the like. For example, a client may manage access to its resources using custom and/or predefined "roles" that can be assumed by authenticated users and authorize a user to perform certain actions. Security policies can become complicated, as described by example below, and computing resource service providers strive to continuously improve security policy evaluation tools and techniques to simplify for its clients the security policy validation process.

The present disclosure provides systems and methods for performing proactive and automated validation and remediation for security policies provided by a client user for application within computing environments of a computing resource service provider. In particular, an embodiment of the provided system implements automated methods for generating a set of request contexts that allow access to a particular resource. A request context provides values of parameters that correspond to the access constraints (i.e., principal user, action requested, resource to be accessed, and conditions to be satisfied by the request) that are evaluated using a security policy in order to determine whether access is granted or denied. The system may produce many (e.g., thousands or tens of thousands) example request contexts by assigning values to the constraints in the policy. The system may iterate an evaluation of the security policy using an automated semantic reasoning engine that is trained using the policy constructs of the service provider's computing environment. Given as input a Policy it generates requests contexts that cover various combination of constraints in the policy language; furthermore, it provides information about which parts of the policy are covered (coverage) by the generated request contexts. The generated request contexts can be evaluated in a policy simulator service to determine whether the expected outcome of a request using the request context (e.g., grant, or denial, of access) is realized in practice.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1B:
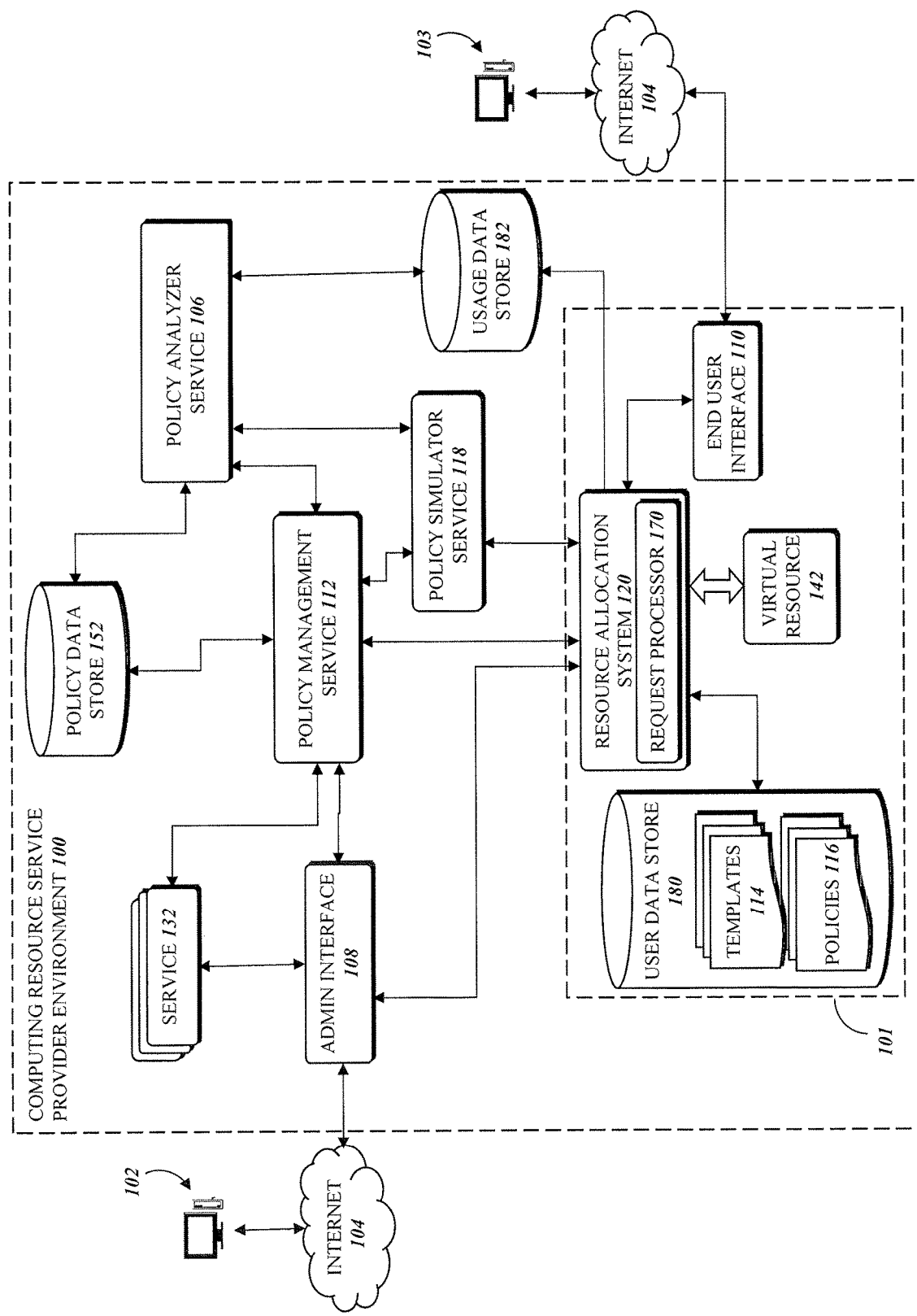

Referring to FIGS. 1A-B, embodiments of the present disclosure may operate within or upon computing systems of a computing resource service provider environment 100 accessible by users of user computing devices 102, 103 via a computer network 104 such as the internet. FIG. 1A illustrates the conceptual operation of the present systems and methods in interaction, via computing device 102, with a "client," or administrator of the virtual computing resources associated with a user account of the client. The environment 100 illustrates an example in which a client may request a policy analyzer service 106 to analyze security policies 154, 156 to determine the relative permissiveness of the policies—in other words, the policy analyzer may be used to determine whether the security policies 154, 156 are equivalent, whether a first security policy (e.g., Security Policy A shown in FIG. 1) is more permissive than a second security policy (e.g., Security Policy B shown in FIG. 1), and more.

In some embodiments, the client may submit a first security policy 154 and an analysis request 158 comprising a request for information that the client wants to know about the policy 154. For example, the client may have a "policy tester" role and may want to know all of the different constraints (and loopholes) that are encoded into the policy 154. In another example, the analysis request 158 may include a partial request context, such as a fixed value for one of the request context parameters (e.g., principal, action, resource, condition) or for an element of one of the parameters (e.g., a prefix of a resource path). The analysis request 158 may be processed by a comparative policy generator 168 that transforms the data in the analysis request 158 to produce a second security policy 156 that is compared to the first security policy 154 to determine relative permissiveness.

In some embodiments, the client 102 utilizes a policy analyzer service 106 to generate complete, concrete request contexts 190 comprising all of the information needed by the computing resource service provider to apply the relevant security policy to a request to perform an action, the request having the request context, and determine whether the request should be granted or denied. A security policy may be information (e.g., encoded in a file) that specifies one or more security permissions. Security permissions may be elements of the security policy that define access rights associated with resources and/or principals of a system. For example, a permission may be used to grant or deny access to computing resources of a computing resource service provider. Policies may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. A security policy may include one or more permission statements as well as additional information such as versioning information and policy-wide information. In some cases, policy-wide information is included in a policy header at the beginning of a policy or may even be stored separately from (and in association with) a policy document. A policy may include multiple policy statements, such as those described elsewhere in connection with FIG. 2.

The policy analyzer service 106 may be a service of a computing resource service provider. The policy analyzer service 106 may be implemented using hardware, software, and a combination thereof. In some cases, the policy analyzer service 106 supports one or more APIs that a client (e.g., the client computing device 102) may use to provide requests to the policy analyzer service 106. The policy analyzer service 106 may support one or more APIs that are used to evaluate security policies, such as an API to determine whether a first security policy 154 is more permissive than a second security policy 156, and an API to generate, receive, and/or simulate request contexts 190 for a policy 154 and based on an analysis request 158.

In some embodiments, permissiveness is used to describe the grant of access to resources. For example, if a first policy grants access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both grant access to the same resources and deny (either implicitly or explicitly) access to the same resources. In some cases, equivalency may refer to two policies explicitly granting access to the same resources and explicitly denying access to the same resources—in other words, if a first policy explicitly denies access to a computing resource and a second policy implicitly denies access to a computing resource (e.g., by not affirmatively granting access in a deny-by-default context) may lack equivalency in some embodiments. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable. It should be noted that unless otherwise specified, examples described herein may implement a deny-by-default security model in which access to a computing resource is denied unless there exists an explicit grant of access to the computing resource. It should furthermore be noted that in the context of these discussions, security policies may be utilized to grant or deny access to resources in the context of a computing resource service provider where a request to access resources may be evaluated by an authorization module or authorization service by utilizing a security policy applicable to the request. An applicable security policy may be a security policy associated with the requestor, a security policy associated with a token that the requestor presents, and more.

The policy analyzer service 106 may be used to generate request contexts 190 that describe the permissiveness of one or more policies. For example, an API call supported by the policy analyzer service 106 may accept two security policies and determine whether they are equivalent, whether one policy is more permissive than the other policy, whether the policies are incomparable, and so on. As a second example, an API call may accept one security policy and generate request contexts 190 that describe the boundaries between an allowed and a denied access request, as defined by the policy. As a third example, an API call may accept a single security policy and compare the security policy against one or more best practices policies. The best practices policies may be a set of security policies that are determined to be a set of permissions which are should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the API call, the type of computing resource requested, and other context information.

A policy analyzer service 106 may include multiple components and/or modules such as a policy parser 160; a propositional logic translator 162; a satisfiability engine 164; a request context generator 166; and a comparative policy generator 168. In some embodiments, the functions of various components and/or modules may be delegated to other services with which the policy analyzer service 106 may utilize. For example, the policy analyzer service 106 may, in some embodiments, utilize a different service for performing functionality related to parsing policies.

The policy parser 160 may be a component or module that receives a security policy (e.g., a security policy received from a client in connection with an API call or obtained via a policy management service) and obtains one or more permission statements from the policy. For example, if the client provides a first policy "A" and a second policy "B" to the policy analyzer service 106, the policy analyzer service 106 may use the policy parser 160 to obtain a first set of permission statements from policy "A" and a second set of permission statements from policy "B." The permission statements may each be associated with the granting or denying access to computing resource. The permission statements may be in a particular format such as JSON, Aspen, and more.

As described herein, propositional logic may refer to a symbolic logic that relates to the evaluation of propositions that may evaluate to either being true or false. Propositional logic may be utilized to evaluate the logical equivalence of propositional formulas. A propositional formula. A propositional formula may be a statement in accordance with a syntax that includes propositional variables and logical connectives that connect the propositional variables. Examples of logical connectives or logical operators may include: "AND" (conjunction), "OR" (disjunction), "NOT" (negation), and "IF AND ONLY IF" (biconditional) connectives. Propositional logic may also be described herein as a "propositional expression" or a "propositional logic expression." In some embodiments, first-order logic may be utilized in place of propositional logic. First-order logic may refer to a formal system that utilizes quantifiers in addition to propositional logic. Examples of quantifiers include "FOR ALL" (universal quantifier) and "THERE EXISTS" (existential quantifier). Unless explicitly noted, embodiments of this disclosure described in connection with propositional logic may also be implemented using first-order logic—for example, in some embodiments, a first-order logic translator (not shown in FIG. 1) may be utilized in place of a propositional logic translator 162 to translate permission statements to first-order logic expressions and a satisfiability engine may evaluate one or more first-order logic expressions to determine whether the expressions are equivalent.

Permission statements (e.g., those obtained by the policy parser 160) may be provided to a propositional logic translator 162. A propositional logic translator 162 may receive a permission statement (e.g., in JSON format) and convert the permission statement into one or more constraints described using propositional logic. The constraints may be described in various formats and in accordance with various standards such as SMT-LIB standard formats, CVC language, and Center for Discrete Mathematics and Theoretical Computer Science (DIMACS) formats.

For example, a permission statement (e.g., a permission statement included as part of a security policy) may be described as:

"Statement": [
{
  "Effect": "Allow",
  "Resource": *,
  "Principal": *,
  "Action": "put*"
}]

The corresponding propositional logic constraints may be generated from the example policy statement may be described as:

(assert policy.statement.resource)
(assert policy.statement.principal)
(assert (=policy.statement.action (or (and (="storage" actionNamespace) (str.prefixof "put" actionName)))))
(assert (=policy.statement.effect.allows (and policy.statement.action policy.statement.resource policy.statement.principal)))
(assert (not policy.statement.effect.denies))
(assert (=policy.allows (and (not policy.denies) policy.statement.effect.allows)))
(assert (=policy.denies policy.statement.effect.denies))

The propositional logic expressions generated by the propositional logic translator 162 may represent a set of constraints that must be satisfied for the corresponding permission statement to be in effect. The constraints described above correspond to a set of constraints that are necessarily satisfied if the preceding permission statement allowing access to APIs starting with "put" (e.g., "put-object") to be fulfilled.

In some embodiments, a first propositional logic expression may be generated from the first set of policy statements and a second propositional logic expression may be generated from the second set of policy statements. The propositional logic expressions may be expressed in a language in accordance with a SMT-LIB standard language such as the STM-LIB 2.0 standard. A satisfiability engine 164 may be used to compare the first propositional logic expression and the second propositional logic expression to determine whether one propositional logic is more permissive than the other.

A satisfiability engine 164 may be used to analyze the permissiveness of two or more propositional logic expressions. The satisfiability engine 164 may be hardware, software, or a combination thereof. In some embodiments, the satisfiability engine 164 allows clients (e.g., internal clients such as the propositional logic translator 162, the policy analyzer service 106, etc.) to determine whether a first propositional logic expression is more permissive than a second propositional logic expression. The satisfiability engine 164 may generate additional propositional logic constraints as part of determining whether the first propositional logic expression is more permissive than the second propositional logic expression.

In some embodiments, the satisfiability engine 164 utilizes the following constraints to determine whether a first policy (e.g., policy A) is more permissive than a second policy (e.g., policy B):

(assert (or policyB.neutral policyB.denies))
(assert policyA.allows)

The constraints may be generated and evaluated in addition to constraints of the first propositional logic expression and the second propositional logic expression, which may be encoded in the manner described above. The constraints may be generated based at least in part on what a client requests. For example, the satisfiability engine 164 may generate constraints that are satisfied only under circumstances where a first policy grants access to a resource and a second policy denies access to the resource or is neutral regarding the resource in response to a request from a caller (e.g., the policy analyzer service 106) to determine whether a first propositional logic expression is more permissive than a second propositional logic expression. Such an embodiment may be implemented in a deny-by-default context where a neutral context (i.e., a context where no permission explicitly grants or denies access to a particular resource). In an allow-by-default context, the satisfiability engine 164 may generate different constraints that are satisfied where the first policy grants access to a resource or is neutral regarding the resource and the second policy does not deny access to the resource.

The satisfiability engine 164 may be used to verify whether the propositional logic constraints (e.g., those obtained from the first and second propositional logic expressions and those generated by the satisfiability engine) are equivalent. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using a satisfiability modulo theories (SMT) constraint solver to determine whether a formula is satisfiable. An example of a SMT-based constraint solver is Z3. Other types of solvers may be utilized in accordance with the techniques described herein as part of implementing a satisfiability engine including but not limited to satisfiability (SAT) solvers and binary decision diagrams (BDD) solvers. The satisfiability engine 164 may generate an equivalence result that indicates whether the formula is satisfiable and, by extension, whether two or more policies are equivalent. In some embodiments, an equivalence result is made available to another computing entity, such as the client computing device 102 that issued a request, a system administrator, and other computing entities.

A request context generator 166 may be used to transform the output of the satisfiability engine 164 into one or more request contexts 190 defined by a set of parameters that are used to request access to a computing resource. That is, when an entity, such as a frontend module of a virtual computing environment in which the computing resource is executing, receives a request for access to the resource, the entity extracts the parameter values to determine the request context, and determines whether to grant or deny the request by applying the appropriate security policy to the parameter values; thus, a request context 190 determines whether the request having the request context 190 is granted or denied. In some embodiments, the request context generator 166 may receive the constraints and/or the parameter values identified by the satisfiability engine 164 as described above. The request context generator 166 may determine the parameter values from the constraints. The request context generator 166 may receive or determine values for all of the parameters of a request context, or for only a portion of the parameters. Using the received or generated values, the request context generator 166 may produce one or more partial and/or complete request contexts. In some embodiments, a request context 190 may be a data structure comprising the parameters and their associated values. For example, the parameters may include the principal, the resource, and the action, and the respective values may be a username, a resource name or address, and one of a list of available actions that can be performed, as described further below.

A complete request context 190 may include all of the parameters needed to determine whether a request having the context should be granted or denied, as well as a specific value for each of the parameters. The generator 166 may generate a single complete request context representing the constraints output by the satisfiability engine 164. The generator 166 may additionally or alternatively generate multiple complete request contexts based on the constraints. For example, given the principal, resource, and action as the parameters, the generator 166 may determine a fixed value for the resource and the action, and may produce a plurality of request contexts 190 each having a unique value for the principal and the corresponding fixed values for the resource and the action. In some embodiments of this example, a first request context 190 may be generated with a value for the variable parameter (i.e., the principal in this example) that corresponds to the value for the constraint as identified by the satisfiability engine 164; and, additional request contexts 190 may be generated with slight variations on the value. Taking this example further, the generator 166 may generate request contexts 190 with any two values fixed and the third value varying, in order to probe the boundary of a security policy as described below. The generator 166 may additionally or alternatively generate partial request contexts 190, wherein one, some, or all of the parameters have unresolved values that are resolved to a literal value by the policy simulation service 118 or the comparative policy generator 168. The unresolved values may be expressions, such as a partial file path with a wildcard indicating any string of characters may appear at that location in the path.

The request contexts 190 may be sent to any or all of the comparative policy generator 168, the policy simulator service 118, and the user device 102 for further processing as described herein. A policy simulator service 118 may be a component of the computing resource service provider environment 100. Receiving a security policy to be simulated for validation or behavioral analysis (e.g., security policy 154), the policy simulator service 118 may receive the request contexts 190 and may produce one or more requests for access, each request having one of the request contexts 190. The policy simulator service 118 may then determine whether the generated request(s) would be granted or denied by applying the security policy 154. The policy simulator service 118 may formulate these determinations as simulation results 192, and may send the simulation results 192 back to the request context generator 166 and/or to the user device 102 as described further below.

A comparative policy generator 168 may be used to generate a comparative security policy (e.g., security policy 156) that can be used by the policy parser 160, propositional logical translator 162, and satisfiability engine 164 to evaluate the permissiveness of the specified security policy 154. In particular, the policy parser 160, propositional logical translator 162, and satisfiability engine 164 may compare the security policy 154 being evaluated to the comparative policy as described above, producing a set of constraints and/or parameter values that describe the differences between the policies 154, 156. The comparative policy generator 168 may receive some or all of the primary security policy 154, the analysis request 158, and the generated request contexts 190, and may use some or all of them to generate one or more comparative policies. In some embodiments, the generator 168 may combine data from these different sources to produce a partial request context that can then be transformed into the comparative policy, as described further below with respect to FIG. 4. The comparative policy may comprise one or more permission statements, some or all of which may correspond to permission statements in the first policy 154. Additionally, the comparative policy may contain permission statements formatted for security best practices, which may not be present in the first security policy 154; the policy analyzer service 106 thus may identify recommended security settings that are absent from the policy 154.

In some embodiments, the policy analyzer service 106 may iterate the above-described functions to generate a large number of complete request contexts 190 based on multiple comparative policies generated in accordance with the security policy 154 being analyzed and any information provided with the analysis request 158. In some embodiments, the set of request contexts 190 may be reduced before or after simulations in order to identify the request contexts that represent "edge cases"—values for corresponding combinations of the security policy 154 constraints where small changes in the values can correspondingly change whether a request having the context is allowed or denied. The policy analyzer service 106 may provide these edge case contexts to the user via a user interface displayed on the user device 102. In various embodiments, the contexts themselves may be displayed, or information describing the contexts may be displayed, in various formats, to convey recommended policy changes or other details about the policy that are derived from the edge case request contexts.

FIG. 1B illustrates a computing architecture in which a client may access the computing systems of the computing resource service provider environment 100 (e.g., using the client's user account credentials) using a computing device 102 to connect to a first user interface 108; an end user may access the client's virtual computing resources using a computing device 103 to connect to a second user interface 110 or another endpoint that connects to the computer network 104. The user interfaces 108, 110 may be websites, web applications, command consoles, and the like, as described further below.

The computing resource service provider implements, within its computing environment 100, at least one virtual computing environment 101 in which users may obtain virtual computing resources that enable the users to run programs, store, retrieve, and process data, access services of the computing resource service provider environment 100, and the like. The virtual computing environment 101 may be one of any suitable type and/or configuration of a compute resource virtualization platform implemented on one or more physical computing devices. Non-limiting examples of virtual computing environments 101 include data centers, clusters of data centers organized into zones or regions, a public or private cloud environment, and the like. The virtual computing environment 101 may be associated with and controlled and managed by the client (e.g., via the user interface 108). In some embodiments, the virtual computing environment 101 of a particular client may be dedicated to the client, and access thereto by any other user of the computing resource service provider environment 100 prohibited except in accordance with access permissions granted by the client, as described in detail herein.

The computing resource service provider environment 100 may include data processing architecture that implements systems and services that operate "outside" of any particular virtual computing environment and perform various functions, such as managing communications to the virtual computing environments, providing electronic data storage, and performing security assessments and other data analysis functions. These systems and services may communicate with each other, with devices and services outside of the computing resource service provider environment 100, and/or with the computing environments. It will be understood that services depicted in the Figures as inside a particular virtual computing environment 101 or outside all virtual computing environments may be suitably modified to operate in the data processing architecture in a different fashion that what is depicted.

In general, the user computing devices 102, 103 can be any computing device such as a desktop, laptop, mobile phone (or smartphone), tablet, kiosk, wireless device, and other electronic devices. In addition, the user computing devices 102, 103 may include web services running on the same or different data centers, where, for example, different web services may programmatically communicate with each other to perform one or more techniques described herein. Further, the user computing devices 102, 103 may include Internet of Things (IoT) devices such as Internet appliances and connected devices. Such systems, services, and resources may have their own interface for connecting to other components, some of which are described below. Although one or more embodiments may be described herein as using a user interface, it should be appreciated that such embodiments may, additionally or alternatively, use any CLIs, APIs, or other programmatic interfaces.

A network 104 that connects a user device 102 to the computing resource service provider environment 100 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user of a user device 102, 103 may access the computing resource service provider environment 100 via a user interface 108, 110, which may be any suitable user interface that is compatible with the user device 102, 103 and the network 104, such as an API, a web application, web service, or other interface accessible by the user device 102, 103 using a web browser or another software application, a command line interface, and the like. In some embodiments, the user interface 108, 110 may include code and/or instructions for generating a graphic console on the user device 102, 103 using, for example, markup languages and other common web technologies. The first, or administrative, interface 108 may, via the connecting device 102, present a user with various options for configuring, requesting, launching, and otherwise operating virtual computing resources in one or more of the computing environments 101. The second, or end user, interface 110 may, via the connecting device 103, present a user with static, dynamic, and/or interactive content processed and provided via the virtual computing resources 142 executing within the client's virtual computing environment 101. User input (e.g., text, computer files, selected elements from a list or menu, mouse clicks on buttons, and other interactions) entered into the user interface 108, 110 by the user may be received and processed by one or more components of the computing resource service provider environment 100, such as the policy analyzer service 106, the policy simulator service 118, a policy management service 112, and/or one or more components in the computing environment 101, such as a resource allocation system 120.

For example, the client may use the user interface 108 to configure a virtual network, create templates 114 for launching virtual computing resources 142 and connecting them to the virtual network and/or the external communication network 104, and create security policies 116 that govern how end users can access the virtual computing resources. Such processes may generate records describing the client's and/or end users' user accounts and store the user account records in a user data store 180. The records may include information indicating that and end user associated with the user account is authorized or approved to request and use virtual computing resources in the computing environment 101. The information may describe limitations on the end user's ability to use virtual computing resources. For example, user account information may specify the types of virtual computing resources the end user is allowed to request and/or the actions (e.g., read, write, copy) the end user is allowed to perform. The client may further input other configuration settings that the system may later use to perform security assessments of virtual computing resources in accordance with the present disclosure. The client may use the administrator user interface 108 to initiate the various security validation and/or remediation procedures described herein. For example, the client may use a graphic user interface, a command line console, and the like, to invoke one or more APIs that perform such procedures.

A computing environment 101 may be configured to provide compute resources to users that are authorized to use all or part of the computing environment 101. Compute resources can include, for example, any hardware computing device resources, such as processor computing power/capacity, read-only and/or random access memory, data storage and retrieval systems, device interfaces such as network or peripheral device connections and ports, and the like. In some embodiments, these resources may be dispersed among multiple discrete hardware computing devices (e.g., servers); these hardware computing devices may implement or communicate with a virtualization layer and corresponding virtualization systems (e.g., a hypervisor on a server), whereby the compute resources are represented by, and made accessible as, virtual computing resources. A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

The computing environment 101 may be configured to allocate compute resources of corresponding hardware computing devices by virtualizing those resources to produce a fixed or variable quantity of available virtual computing resources. The available resources may be provided in a limited manner to one or more users that submit requests for virtual computing resources within the computing environment 101; such resources that are allocated to and/or in use by a particular user are represented by virtual resources 142. Various functions related to processing requests to use virtual resources, to otherwise managing the allocation and configuration of the available resources and allocated virtual resources 142, and to limiting the amount of virtual resources 142 that are allocated to a particular user in accordance with the present systems, may be performed by one or more services executing within the computing environment 101 and/or outside of it (i.e., in the data processing architecture of the computing resource service provider environment 100).

In some embodiments, as illustrated in FIG. 1B, a resource allocation system 120 operating within the computing environment 101 may cooperate with security policy management service 112 implemented outside of the computing environment 101 to manage the allocation of virtual resources according to security policies. In some embodiments, the resource allocation system 120 receives at least the communications that contain requests, commands, instructions, and the like (collectively herein, "requests"), to allocate, launch, execute, run, or otherwise provide, for use by an identifiable user (e.g., the requesting user or another specified user), one or more virtual computing resources in the computing environment 101. The request received by the policy analyzer service 106 may be generated directly by the client (e.g., using the administrative user interface 108) or by a connected end user (e.g., using the user interface 110), or the request may be generated as, or in response to, an output (e.g., a trigger event message) of another component of the computing resource service provider environment 100 or of an external device.

The resource allocation system 120 may include one or more services, implemented in software or hardware devices, for performing pertinent tasks. In some embodiments, the resource allocation system 120 may include a request processor 170 which is configured by executable program instructions to receive a request for virtual computing resources, parse the request into delivery and other parameters, determine whether the request can be fulfilled, and if the request can be fulfilled, provide a virtual computing resource 142 configured for use according to the parameters of the request. The request processor 170 may additionally be configured to send the request, or some or all of the data contained in the request or describing the request, to the policy management service 112 or the usage data store 182 for associated processing by the policy analyzer service 106 as described herein. The request processor 170 or another component of the resource allocation system 120 may be configured to send to the user interface 108 information related to processing the request, such as error, completion, and other status messages.

The resource allocation system 120 may additionally collect and/or generate usage data describing aspects of the virtual computing resource 142. Non-limiting examples of such usage data may include: configuration and/or status parameters of the virtual computing resource 142 at the time of launch or failure to launch; information related to the processing of a request to use virtual computing resources; monitoring data collected by monitoring virtual computing resource 142 operations, such as network communications, data storage and retrieval and other disk access operations, execution of software programs, and the like; and, state data such as a snapshot of the state of the virtual computing resource 142 at the time it is provisioned, deploys, terminates, fails, or generates an error, or at any other time. The usage data may be stored in a usage data store 182 of the computing resource service provider environment 100. Additionally or alternatively, the usage data store 182 for a computing environment 101 may be implemented within the computing environment 101 itself. The usage data stored in the usage data store 182 may be accessible only to the client, or may be accessible by certain other systems and/or services. For example, the policy analyzer service 106 may, by default or by user authorization, access and use the usage data of one user or multiple users to update or interpret a model of a security policy as described further below.

In some embodiments, a policy data store 152 may include security policies stored by the provider, such as best practices policies and other security policies that may be used to validate a user-provided policy (e.g., via comparative analysis of representative propositional logic, as described above). The policy management service 112 may store, retrieve, modify, or delete security policies in the policy data store 152 automatically and/or in response to user input, triggering events, or commands from other services 132 of the computing resource service provider. For example, the services 132 may include a service that routinely obtains the newest security policies for implementing protection from Common Vulnerabilities and Exposures; the policy management service 112 may receive these new policies from the service 132 and store them in the policy data store 152, replaced outdated stored policies in the process. Additionally or alternatively, the policy analyzer service 106 may communicate with the policy data store 152, such as to obtain one or more policies from the policy data store 152 for use as comparative policies when evaluating a user-provided security policy.

Figure 2:
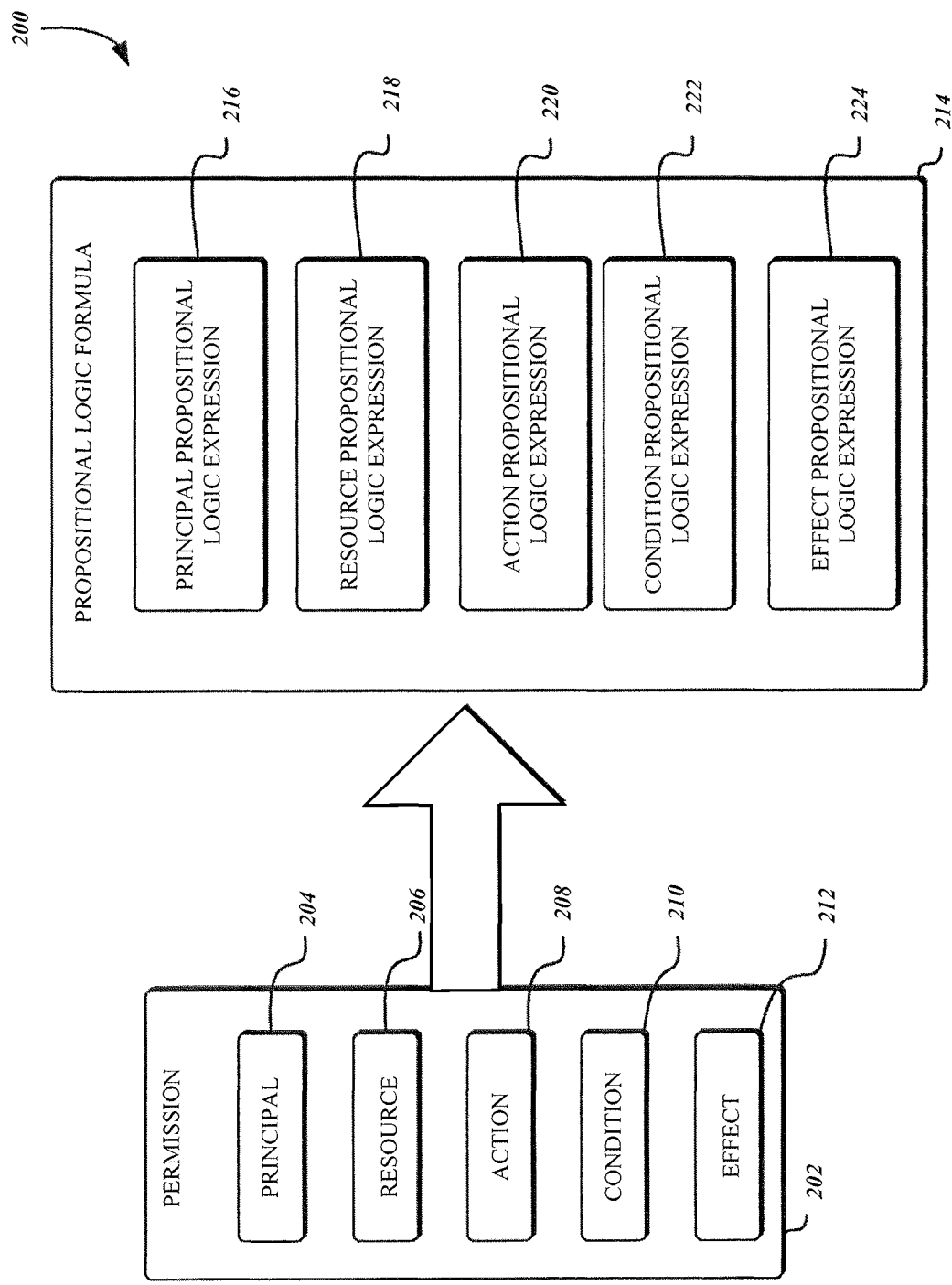
FIG. 2 is a diagram illustrating an example conversion of a permission from a security policy into a propositional logic formula.

FIG. 2 shows an illustrative example of a diagram 200 in which a security permission and a corresponding propositional logic expression are shown. The permission 202 illustrated in FIG. 2 may be one of a plurality of security permissions specified in a security policy, such as security policies described elsewhere in connection with FIGS. 1A-B. In some embodiments, a permission 202 may specify a principal 204, a resource 206, an action 208, a condition 210, and an effect 212. In some embodiments, a permission 202 may also specify a plurality of one or more of these elements such as, for example, a set or class of users, a collection of resources, several different actions, and/or multiple conditions. In some embodiments, the permission 202 may specify one or more wildcard or otherwise modifiable characters that may be used to denote that the permission 202 may be modified to make the permission 202 applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal 204 may be a user, a group, an organization, a role, or a collection and/or combination of these or other such entities. A principal 204 may be any entity that is capable of submitting API calls that cause an action associated with a resource to be performed and/or any entity to which permissions associated with a resource may be granted. As an example, a permission 202 may have a principal 204 element specified in the following manner:

"Principal": "rn:ws:iam::bucksfan8"

In some embodiments, the principal 204 is identified by a resource name that uniquely identifies the principal 204. A principal 204 may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semicolons in the example above between "iam" and "bucksfan8")—in some formats and/or for some resources, a region namespace may be option; and "bucksfan8" may refer to an identifier for the account, such as the account that owns the resource 206 specified in the permission 202.

The resource 206 may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources 206 may be organized in a hierarchy, and may use structures such as folders, directories, buckets, etc. to organize sets of computing resources into groupings. In some cases, policies and/or permissions may be applied directly to a bucket and grant cross-account access to an environment. As an example, a permission 202 may have a resource 206 element specified in the following manner:

"Resource": "rn:ws:storage:::bucket/Booker_ROY.png"

In some embodiments, the resource 206 is identified by a resource name that uniquely identifies the resource 204. In some cases, the resource 206 may share a same naming convention as the principal 204 or other elements of the permission. However, this need not be the case, as each separate element of a permission 202 may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" my refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate an image in the Portable Network Graphics (PNG) format and is stored in a bucket.

The action 208 may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission 202 may have an action 208 element specified in the following manner:

"Action": "storage:GetObject"

In this example, the action that is allowed or denied (determined based on the effect 212 specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. As a second example, an action element described as "Action": "iam:*AccessKey*" may refer to actions supported by an identity and access management service in connection with access keys of a service—illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

The condition 210 element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action 208 element. As an example, a permission 202 may have a condition 210 element specified in the following manner:

"Condition":{"DateLessThan":{"ws:CurrentTime": "2017-12-13"}}

In this example, the condition, the "ws:CurrentTime" value of the request is compared against a literal value "2104-12-13" using the condition operator "DateLessThan" which may be used to evaluate whether the condition is met. In this example, the condition may be true when the current time (e.g., the time the request is received by the service provider) is less than the supplied date of Dec. 13, 2014. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys; examples are discussed herein. In some embodiments, such as those where conditions include quantifier, first-order logic may be utilized rather than propositional logic.

An effect 212 may refer to whether the permission 202 is used to grant or deny access to the computing resources specified in the permission 202 in the resource 206 element. An effect 212 may be an ALLOW effect, which grants access to a resource, and a DENY effect, which denies access to a resource. In some embodiments, access to computing resources of a computing resource service provider are denied by default and a permission affirmatively including an ALLOW effect is required. As an example, a permission 202 may have an effect 212 element specified in the following manner:

"Effect": "ALLOW"

Accordingly, a permission statement that grants a particular principal (e.g., "rn:ws:iam::ducksfan8") access to call a storage service API (e.g., "storage:GetObject") and obtain a particular image (e.g., "rn:ws:storage:::bucket/Booker_ROY.png") when a specific condition is true (e.g., the API request is made prior to Dec. 13, 2016) may be specified in the following manner:

```
"Statement": [
  {
    "Effect": "ALLOW",
    "Principal": "rn:ws:iam::bucksfan8",
    "Action": "storage:GetObject",
    "Resource": "rn:ws:storage:::bucket/Booker_ROY.png",
    "Condition": {
      "DateLessThan": {
        "ws:CurrentTime": "2017-12-13"
      }
    }
  }
]
```

It should be noted that the examples described above merely described one of many ways in which permissions may be expressed. Of course, in other embodiments, variations on the principles described above in connection with FIG. 2 may be applied in various ways.

In some embodiments, elements may be described in inverse (e.g., negative) terms. An inverse element may be applied to all matches except for those specified in the element. For example, if a permission statement is described as "NotPrincipal:bucksfan8" then the permission statement applies to all principals except the particular principal or principals listed in the permission statement—in this case, the permission statement would apply to all principals except ducksfan8. An inverse element may be used in conjunction with the principal element (e.g., a "NotPrincipal" element would apply to all principals except those listed), the action element (e.g., a "NotAction" element would apply to all actions except those listed), the resource element (e.g., a "NotResource" element would apply to all resources except those listed), and so on.

As shown in FIG. 2, a permission 202 may be used to generate a propositional logic expression 214. A propositional logical expression 214 may comprise a set of logical expressions which represent the permission 202. Propositional logical expressions may be evaluated to determine whether a formula is satisfiable. For example, propositional logic may be used to determine whether it is satisfiable that a resource is allowed under a first propositional logical expression corresponding to a first security policy comprising a first set of permissions and the resource is not allowed (e.g., explicitly denied and/or not explicitly granted an ALLOW effect) under a second propositional logical expression corresponding to a second security policy comprising a second set of permissions. In some embodiments, the permission 202 statement may be used to generate a propositional logic expression 214. The principal 204 element may map to a principal propositional logic expression 216 which may comprise of statements in propositional logic and one or more assertions that are used as constraints on whether a formula is satisfiable. An example of this mapping is described below. Likewise, the resource 206 element may map to a resource propositional logic expression 218, the action 208 element may map to an action propositional logic expression 220, the condition 210 element may map to a condition propositional logic expression 222, and the effect 212 element may map to an effect propositional logic expression 224. Various examples in connection with these mappings are described below.

Figure 3:
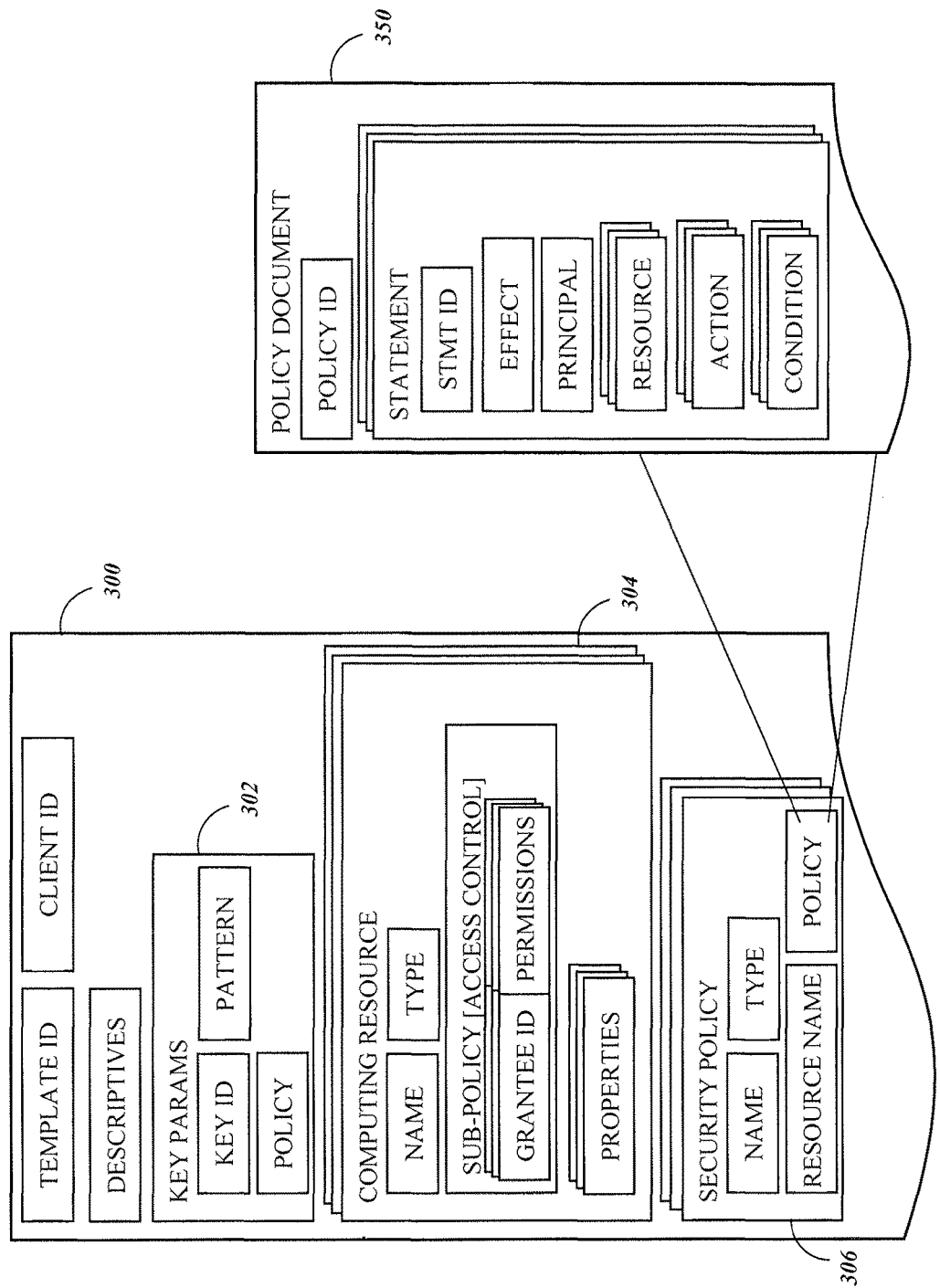
FIG. 3 is a diagram of an example template used to provision and deploy virtual computing resources.

FIG. 3 illustrates an example template 300, which may be an example of the template 114 of FIG. 1B. A template may have more or less information than the illustrated template 300; the following description provides some examples of resources that can be defined and launched using a template. A template 300 may include header information such as a template identifier, a user identified for the user (i.e., client) who owns the template, and one or more fields containing descriptive information such as versioning and text describing what the template 300 is used for. One or more definitions 302, 304, 306 may be included in the template, and each may provide parameters to be included in the configuration of resources created and/or launched from the template 300. Non limiting examples of resource definitions include: an encryption key definition 302 including a key identifier, an access policy, and one or more patterns for performing cryptographic functions; a computing resource definition 304 including a name for identifying virtual resource instances launched from the definition 304, a resource type (e.g., virtual machine, data store, message queue, etc.), one or more access control lists or other security sub-policies identifying one or more users and the access permissions they are granted, and one or more properties of the corresponding virtual resource instance; and, a security policy definition 306 including a policy name, policy type, the name of the computing resource the security policy attaches to, and the security policy 350 itself or a reference (e.g., file name) thereto.

A resource allocation system as described above may be configured to create and configure virtual resource instances from the definitions in the template 300. In one example, the resource allocation system may read a computing resource definition 304 for a virtual machine to determine the type and amount of physical and/or virtual resources to allocate for an instance of the virtual machine. This information may be determined from the properties of the definition 304, such as a virtual machine image file or a plurality of parameters identifying the file system, operating system, runtime environment, number and composition of containers, software program(s) to execute, and the like. The properties may also identify how an associated instance should be connected to the virtual network and/or configured as an endpoint connected to an external communication network. In another example, the resource allocation system may read a security policy definition 306 to create a security policy and attach the security policy to the example virtual machine instance. A security policy may include a policy document 350 that includes a policy identifier and one or more permission statements as described above with respect to FIG. 2.

Figure 4:
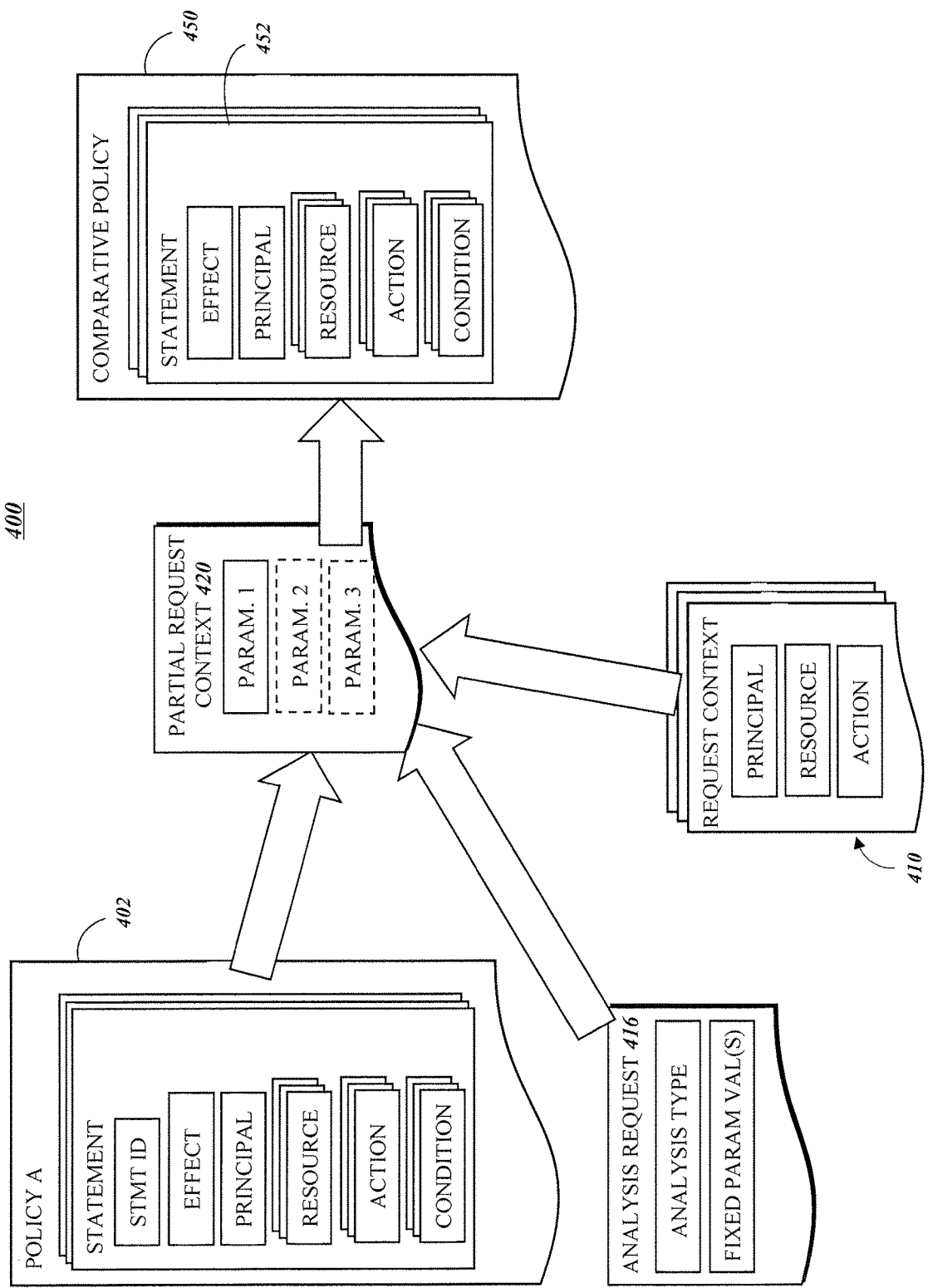
FIG. 4 is a diagram illustrating an example generation of a comparative security policy.

FIG. 4 shows an illustrative example diagram 400 in which a comparative security policy 450 that can be used to evaluate the permissiveness of a user-provided security policy 402 (such as the security policies described above, particularly security policy 350 of FIG. 3) is generated based on data associated with the evaluation. In some embodiments, the comparative policy 450 may be any typical policy that includes one or more permission statements 452 that can be translated into propositional logic and compared to propositional formulae representing the statements of the user-provided policy 402, as described above with respect to FIGS. 1A and 2. A system (e.g., a network of computing devices, a processor executing specific program instructions stored in computer memory, or another set of physical and/or virtual computing resources cooperating to implement the comparative policy generator 168 of FIG. 1A) may generate the comparative policy 450 by compiling and processing data from any or all of the user-provided policy 402, an analysis request 416 input by the client, one or more partial or complete request contexts 410 generated (e.g., by the request context generator 166 described above with respect to FIG. 1A) during the evaluation, and other policy evaluation data.

In some embodiments, the system may transform the compiled data to produce one or more partial request contexts 420 having a target parameter set derived from the user-provided policy 402, the analysis request 416, and/or the request context(s) 410. For example, the partial request context 420 may have the same parameter set as the request context(s) 410 (e.g., principal, resource, and action). The partial request context 420 may have fixed or variable literal values or logical values assigned thereto; these values may be computed and/or derived from the evaluation data being used. In one example, at least one of the parameters (Parameter 1 of the illustrated example, which may be the principal, the action, or the resource) of the partial request context 420 is assigned a fixed value; this fixed value may be expressly stated in one of the policy 402 statements, and/or in the analysis request 416, and/or in one or more of the request contexts 410. For example, the data of the analysis request 416 may include an analysis type and a fixed value "XXX" for the "resource" parameter; the analysis request 416 may be described in English as, "identify all the ways a requestor can get access to resource XXX." Partial request contexts 420 generated in response to this analysis request 416 include the "resource" parameter with fixed value "XXX" that remains the same across all partial request contexts 420, and literal or logical values for the other parameters that may vary across different contexts 420, and that may be derived from other data such as the values of the "principal" and "action" parameters of the policy 402 statement(s) and/or the request context(s) 410.

In one embodiment, each of the partial request contexts 420 may be transformed to produce a corresponding permission statement 452 of the comparative policy 450. The permission statements 452 may have the same or a compatible format as that of the permission statements in the user-provided policy 402. Thus, an example transformation would be to match each parameter in a data structure representing the partial request context 420 to a corresponding parameter in a standardized permission statement data structure; then, to transfer the value of each context parameter to the corresponding statement parameter, which may include resolving any logical value to a literal value that can be stored in the data structure; and finally, to produce the comparative policy 450 having the designated policy formatting, with permission statements 452 generated from the statement data structure. In another embodiment, where propositional logic comparisons are to be made, each of the partial request contexts 420 may be transformed into a corresponding propositional statement using the values any missing parameters (e.g., "effect") from the permission statement(s) in the user-provided policy 402.

Figure 5:
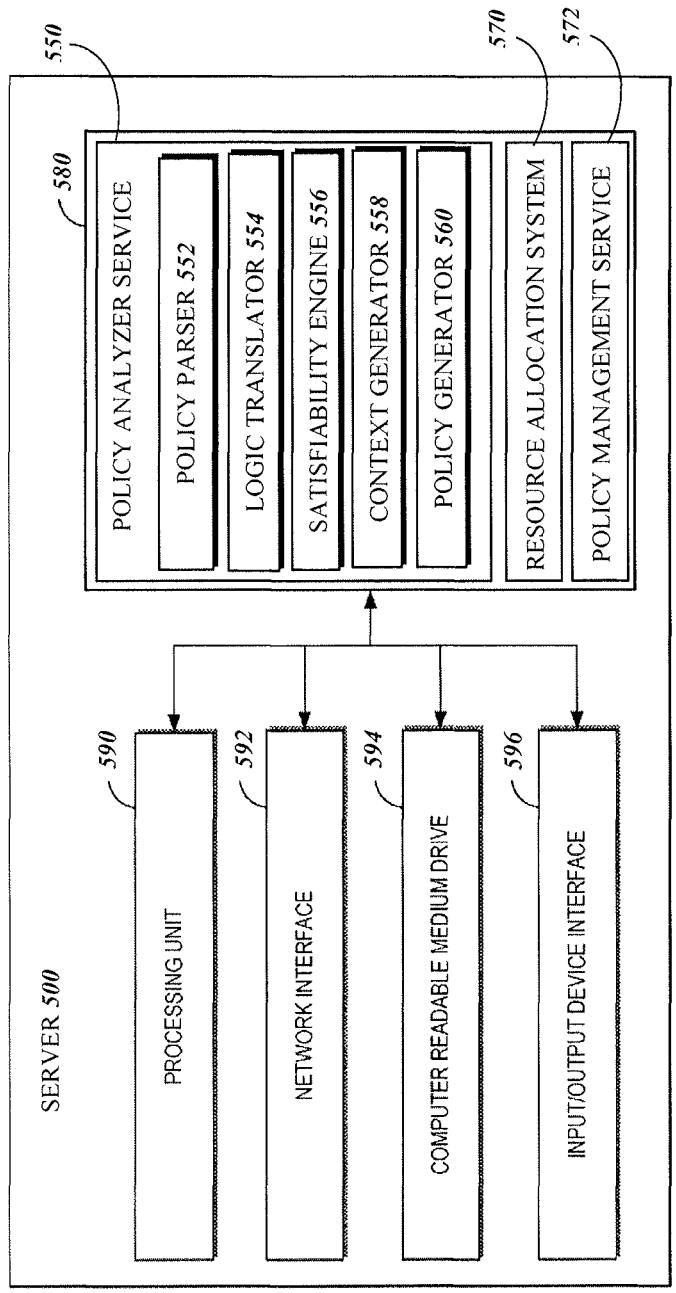
FIG. 5 is a diagram of an example server computing device specially configured to implement the presently described systems and methods.

FIG. 5 depicts a general architecture of a computing system (referenced as server 500) that processes requests to allocate virtual computing resources to a user in a computing environment as described above. The general architecture of the server 500 includes an arrangement of computer hardware and software modules that may be used to implement aspects of the present disclosure. The hardware modules may be implemented with physical electronic devices, as discussed in greater detail below. The server 500 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in the preceding Figures, including the resource allocation system, the security assessment system, and the network-accessible services system, each of which may be implemented in the same or a separate architecture from the others.

As illustrated, the server 500 includes a processing unit (processor) 590, a network interface 592, a computer readable medium drive 594, an input/output device interface 596, all of which may communicate with one another by way of a communication bus. The network interface 592 may provide connectivity to one or more networks or computing systems. The processor 590 may thus receive information and instructions from other computing systems or services via a communication network. The processor 590 may also communicate to and from memory 580 and further provide output information for an optional display (not shown) via the input/output device interface 596. The input/output device interface 596 may also accept input from an optional input device (not shown).

The memory 580 may contain computer program instructions (grouped as modules in some embodiments) that the processor 590 executes in order to implement one or more aspects of the present disclosure. The memory 580 generally includes RAM, ROM and/or other persistent, auxiliary or non-transitory computer-readable media. The memory 580 may include computer program instructions and other information for implementing aspects of the present disclosure. For example, in one embodiment, the memory 580 implements a policy analyzer service 550, a resource allocation system 570, and a policy management service 572, as described above. The memory 580 or another component of the server 500 may further include a computing environment API that may be executed by the processor 590 to enable the services to access and otherwise communicate with the network-accessible services systems described above. In addition, the memory 580 may include and/or provide executable instructions or reference data that enable the processor 590 to communicate with one or more data repositories (not shown), for example, to access usage data, user data, security policies, and the like.

The policy analyzer service 550 may include several services implemented in hardware, software, or a combination thereof, and communicating with various other services and with physical (e.g., hard drives) or virtual resources (e.g. logical drives) to obtain and analyze data for validating a user-provided security policy according to the processes described herein and within the parameters of any analysis request received. In some embodiments, a different service 552-560 may analyze, transform, and/or produce different types of data needed to evaluate a security policy, although in other embodiments services may be consolidated, or unused if the corresponding type of data is not collected or analyzed. For example, some or all of the services 552-560 may be "chained" together, in that a first service 552 analyzes data to produce a first result that is delivered to a second service 554, which analyzes the first result as the service's 554 input data (alone or with other data) and produces a second result, and a third service 556 uses the second result (and possibly other data) as its input data to produce a third result. A client may authorize the services 552-560 to access virtual resources associated with the client's user account, so that the services can obtain private and/or remote data.

In various examples, the policy analyzer service 550 may include a policy parser 552, a logic translator 554, and a satisfiability engine 556 that cooperate to analyze security policies to determine the relative permissiveness of the policies—in other words, the services 552-556 may be used to determine whether two security policies are equivalent, whether a first security policy is more permissive than a second security policy, and more. In this context, permissiveness is used to describe access to resources. For example, if a first policy can be utilized to access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both can be utilized to access to the same resources and deny (either implicitly or explicitly) access to the same resources. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable. It should furthermore be noted that in the context of these discussions, security policies may be utilized to grant or deny access to resources in the context of a computing resource service provider where a request to access resources may be evaluated by an authorization module or authorization service by utilizing a security policy applicable to the request. An applicable security policy may be a security policy associated with the requestor, a security policy associated with a token that the requestor presents, and more.

In embodiments as described above, the policy parser 552 may accept, as input, one or more security policies and translate them into their constituent permission statements. The permission statements may each be associated with the granting or denying access to (a) computing resource(s). The logic translator 554 may convert the permission statements into corresponding propositional logic formulae that represent the accessibility constraints represented by the permission statements. The constraints may be described in various formats and in accordance with various standards such as SMT-LIB standard formats, CVC language, and Center for Discrete Mathematics and Theoretical Computer Science (DIMACS) formats. The propositional logic expressions may represent a set of constraints that must be satisfied for the corresponding permission statement to be in effect. The satisfiability engine 556 may compare propositional logic formulae of different policies to each other to determine whether the input security policies are equivalent, whether one policy is more permissive than another policy, whether the policies are incomparable, and so on. The satisfiability engine 556 may compare a first propositional logic expression and a second propositional logic expression (of disparate formulae) to determine whether one propositional logic is more permissive than the other, and/or to otherwise analyze the permissiveness of two or more propositional logic expressions. The logic translator 554 and/or satisfiability engine 556 may generate additional propositional logic constraints as part of determining whether the first propositional logic expression is more permissive than the second propositional logic expression. The constraints may be generated and evaluated in addition to constraints of the first propositional logic expression and the second propositional logic expression. The constraints may be generated based at least in part on client-provided settings. For example, the logic translator 554 may generate constraints that are satisfied only under circumstances where a first policy grants access to a resource and a second policy denies access to the resource or is neutral regarding the resource. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In one example, the satisfiability engine 556 may interpret the formulas at least in part using an SMT solver such as Z3.

The input security policies may include a user-provided security policy that is being evaluated, and one or more comparative policies that may be stored security policies, such as best practices policies (as described above), or may be other user-provided policies (provided by the same user or another user), or may be comparative policies generated by the policy generator 560. As explained above, one embodiment of best practices policies may be a set of security policies that are determined to be a set of permissions which are should not be allowed. For example, a first best practices policy may be that a particular data container should not be world-writeable (i.e., any principal, even a guest user or anonymous user can write to the container). The policy analyzer service 550 may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the type of computing resource requested, information in the request for resources, and other context information.

The policy analyzer service 550 may include a context generator 558 that receives permissiveness data, such as a set of satisfiable constraints describing a complete request for access to the computing resource governed by the user-provided security policy, from the satisfiability engine 556 and transforms the permissiveness data into one or more partial or complete request contexts, as described above. For example, the context generator 558 may determine which constraints apply to each parameter in a set of request context parameters that together define a complete request context; then, the context generator 558 may compute, based on data associated with the corresponding applicable constraint or combination of constraints, a value for each of the request context parameters. The parameter/value pairs may be stored in a data structure as a generated request context. The context generator 558 may send the generated request contexts to a policy simulation service, and may receive simulation results describing whether a request context produced the expected outcome (i.e., a grant or denial of access to the computing resource) when used to configure a request for access in a virtual computing environment. The context generator 558 may use the simulation results to produce additional request contexts and/or to generate notifications/alerts when the simulation result is not as expected.

The context generator 558 may also generate data for formatting user interface displays to convey the request contexts or information about the request contexts (e.g., recommendations for modifying the security policy) to the client.

The policy analyzer service 550 may include a policy generator 560 that generates comparative security policies as described above. The policy generator 560 may receive as input different types of data from several sources; non-limiting examples of input data include the user-provided security policy being evaluated, a stored policy such as a best-practices policy, a previously-generated comparative policy, request contexts generated by the context generator 558, and an analysis request submitted by the client and containing parameters for the policy analysis. From the input data, the policy generator 560 may configure one or more sets of permission statements each encoding constraints that can be compared to the constraints embodied in the user-provided security policy. In one embodiment, the policy generator 560 encodes constraints that are slightly different from (i.e., not equivalent to) those of the user-provided policy; these constraints may be derived from the generated request contexts or other input data. In some embodiments, the policy generator 560 may compile and transform the input data to produce a partial request context that is then translated into a permission statement that would be satisfied by the partial request context. Each set of permission statements is collectively added to a new comparative policy, which the policy generator 560 sends to the policy parser 552 as one of the input policies.

Figure 6:
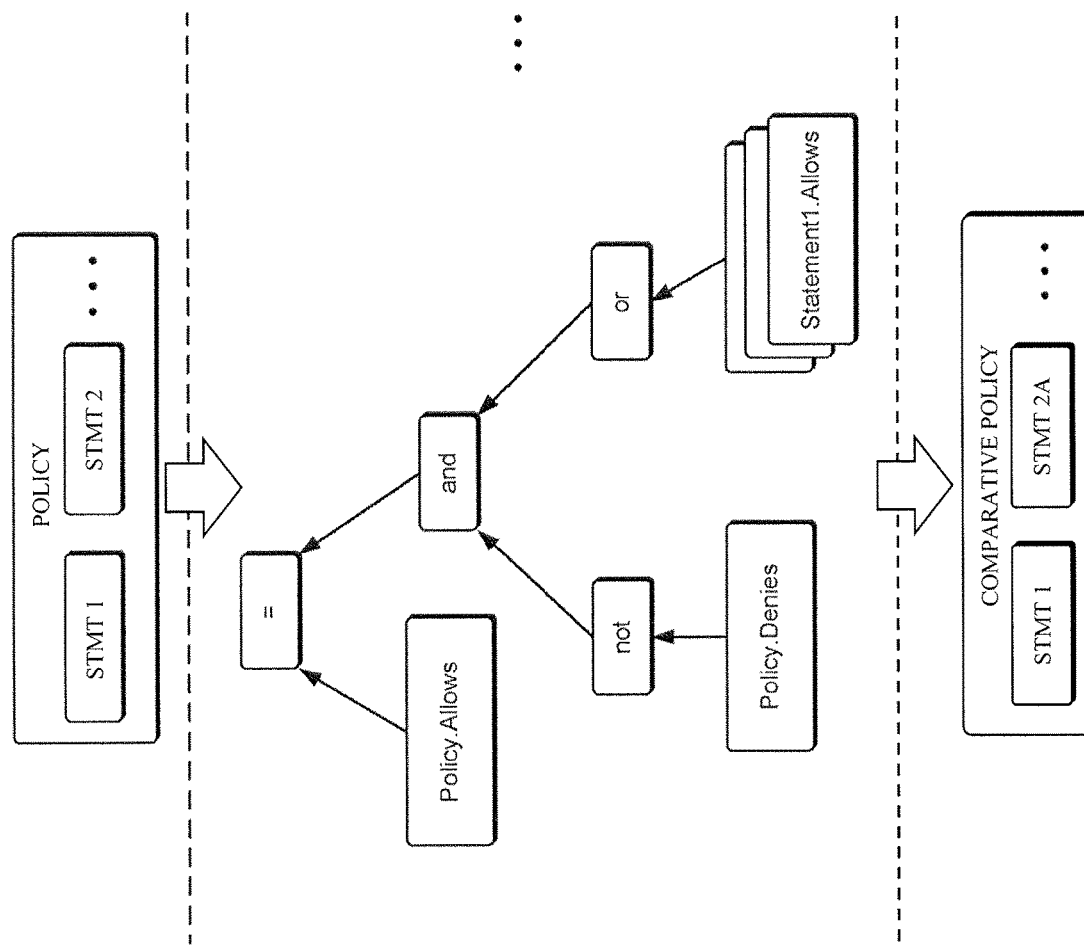
FIGS. 6-8 are diagrams illustrating the use of propositional logic to transform security policy statements into a comparative policy.

FIG. 6 shows an illustrative example of a diagram 600 in which propositional logic is used as part of determining satisfiability of a propositional logic formula based at least in part on a policy. The diagram 600 illustrates an example policy which may be in accordance with those described elsewhere in this disclosure, such as in connection with FIGS. 1-4. The diagram 600 illustrates an aspect in which propositional logic (shown below the dotted lines) is used to determine whether the policy is satisfiable. The policy may include one or more policy statements that may be constraints on the propositional logic. An example policy statement (e.g., a permission statement) is described elsewhere in this disclosure in connection with FIG. 2, and propositional logic transformations of the permission statements are described and illustrated in connection with FIGS. 7-9.

The diagram 600 illustrates a propositional logic that may be used in part to determine whether the policy is satisfiable. In the diagram 600, the propositional logic illustrates a constraint used in part to determine satisfiability of a policy. In particular, the diagram 600 illustrates a constraint that what the policy allows must be equivalent to what was not explicitly denied by the policy and is allowed by any of the one or more statements of the policy. In some embodiments, the propositional logic may be expressed in accordance with the SMT language which may be in accordance with one or more SMT LIB standards. Other formats may be used to describe propositional logics, such as CVC language and Center for Discrete Mathematics and Theoretical Computer Science (DIMACS) formats. The SMT-LIB standard: version 2.5, SMT LIB standard version 2.0, SMT-LIB standard version 1.2, and SMT-LIB standard version 1.0 are hereby incorporated by reference.

For example, an implementation in accordance with STM-LIB standard v2.0 may include constraints as described above in the following form:

(assert(=policyA.allows (and (not policyA.denies) (or
  policyA.statement0.allows policyA.statement1.allows
  policyA.statement2.allows . . . ))))

It should be noted that, here and elsewhere, the examples are given to illustrate concepts for how to implement various embodiments in accordance with the teachings of this disclosure. For instance, in the example above, the ellipses are used to illustrate that a policy with more than two permission statements will have more constraints that are connected using OR statements. It should be noted that propositional logics may be expressed using Polish notation (i.e., prefix notation) in various embodiments such as those in accordance with various SMT-LIB standards.

In connection with the discussion regarding FIGS. 6-9, the constraints described may be used in combination to define the constraints for a policy (e.g., policyA), which may be described in the following form:
"Statement": [
  {
    "Effect": "ALLOW",
    "Principal": "*",
    "Action": "*",
    "Resource": "*"
  }
]

Similarly, the constraints for a second policy (i.e., policyB) may be described in the following form:
"Statement": [
  {
    "Effect": "ALLOW",
    "Principal": "*",
    "Action": "sns:*",
    "Resource": "*"
  },
  {
    "Effect": "ALLOW",
    "Principal": "*",
    "NotAction": "sns:Delete",
    "Resource": "*"
  }
]

Accordingly, in addition to these constraints, additional constraints may be utilized to determine whether one policy is more permissive than another policy. For example, given two policies (e.g., policyA and policyB of the examples above), the following constraints may be used to determine whether a first policy (i.e., policyA) is more permissive than a second policy (i.e., policyB):
(assert (or pB.neutral pB.denies))
(assert pA.allows)

In various embodiments, a policy analyzer service may be utilized to determine that the above policies (policyA and policyB described above) are equivalent.

In some embodiments, such as those that implementing a deny-by-default system, an authorization module denies access to any resources of a computing resource service provider which a requestor (e.g., a principal) is not explicitly granted access to (e.g., via a permission statement affirmatively allowing access to the resource).

For example, an implementation in accordance with SMT-LIB standard v2.0 may include constraints as described above in the following form:
(assert (=p0.neutral (and (not p0.allows) (not p0.denies))))

In other words, constraint provided by the example above is such that what a policy (e.g., policyA) is neutral towards is equivalent to what was not allowed by the policy and what was not denied by the policy.

Figure 7:
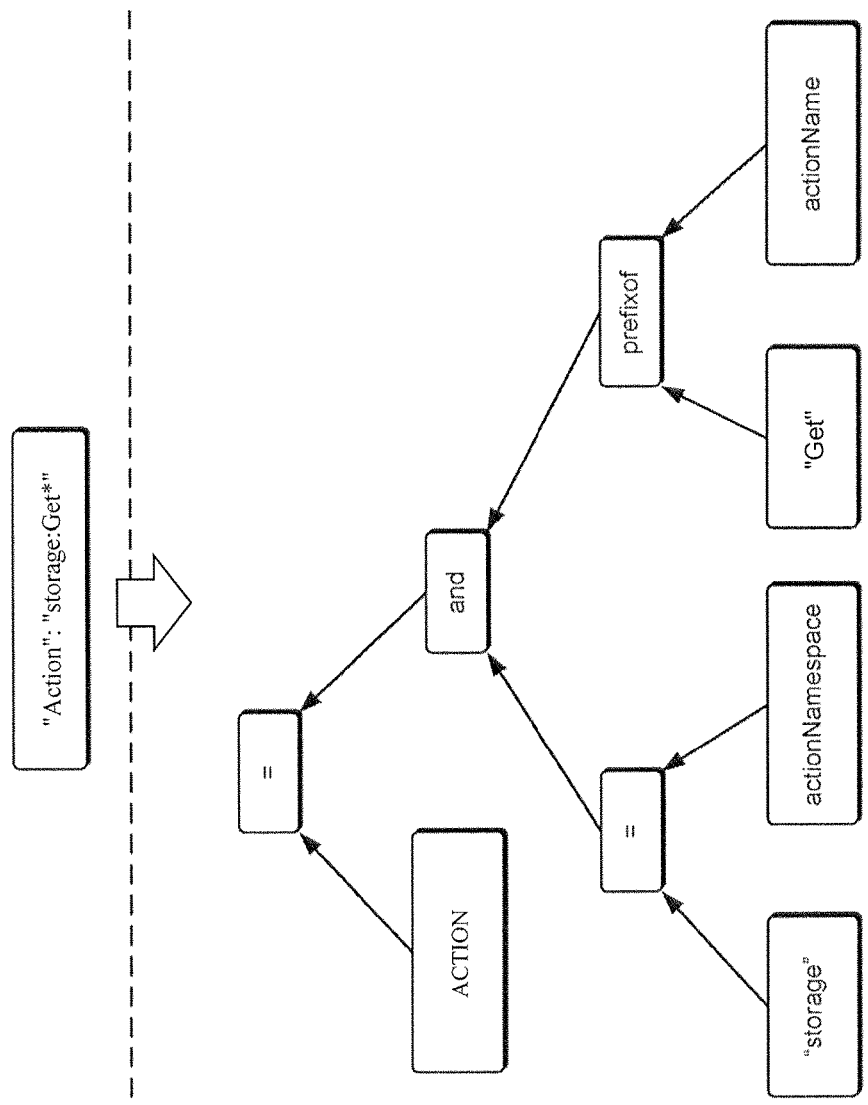

FIG. 7 shows an illustrative example of a diagram 700 where an element (e.g., as part of a policy) is translated to a propositional logic. The translation may be performed by any suitable component, such as propositional logic translators discussed in connection with FIG. 1. The diagram 700 illustrates an example where a JSON element (shown above the dotted line) is translated to a propositional logic (shown below the dotted line). The propositional logic may be expressed in accordance with the SMT language which may be in accordance with one or more SMT LIB standards.

The diagram 700 represents the "Action" parameter of the "allow" statement in the following example security policy:

Policy: {
  "Statement": [
    {
      "Effect": "Deny",
      "Principal": "*",
      "Action": "storage:*",
      "Resource": "storage::examplebucket/*/private/*"
    },
    {
      "Effect": "Allow",
      "Principal": { "ID": "111122223333" },
      "Action": "storage:Get*",
      "Resource": "storage::examplebucket/*/uploads/*"
    }
  ]
}

As an example, an action element of a permission statement that grants or denies (depending on the effect element of the permission statement) access to some resources (e.g., specified elsewhere in the permission statement) may be expressed as a propositional logic with the following constraints:
(assert (=policy.action (or (and (="storage" action-Namespace) (str.prefixof "Get" actionName)))))

In other words, the action element above the dotted line in the diagram 700 may be translated to a propositional logic having a constraint that is satisfied when the action has a "storage" namespace and an action name that has a string prefix of "Get" such as "GetObject" or "GetAllObjects" or "GetContainer" and so on. In some embodiments, various string evaluation functions may be used as part of a constraint, such as evaluating string prefixes, suffixes, lengths, substrings (e.g., whether a certain string is included as part of a second string), and so on. Comparison of strings may further include additional comparison parameters such as making case insensitive comparisons, ignoring symbols and punctuations, ignoring diacritics, ignoring differences between hiragana and katakana characters, and so on. The effect, action, resource, and principal constraints may be in accordance with similar techniques. The constraints may also differ depending on what elements are included in the permission statement. For example, if a permission statement includes a condition, the constraint may further include that the condition be satisfied for the constraint to be satisfied. In some embodiments, at least one of the effect, action, resource, and principal elements is a required element of the permission statement such that a valid policy statement must have at least one of the effect, action, resource, and principal elements.

Figure 8:
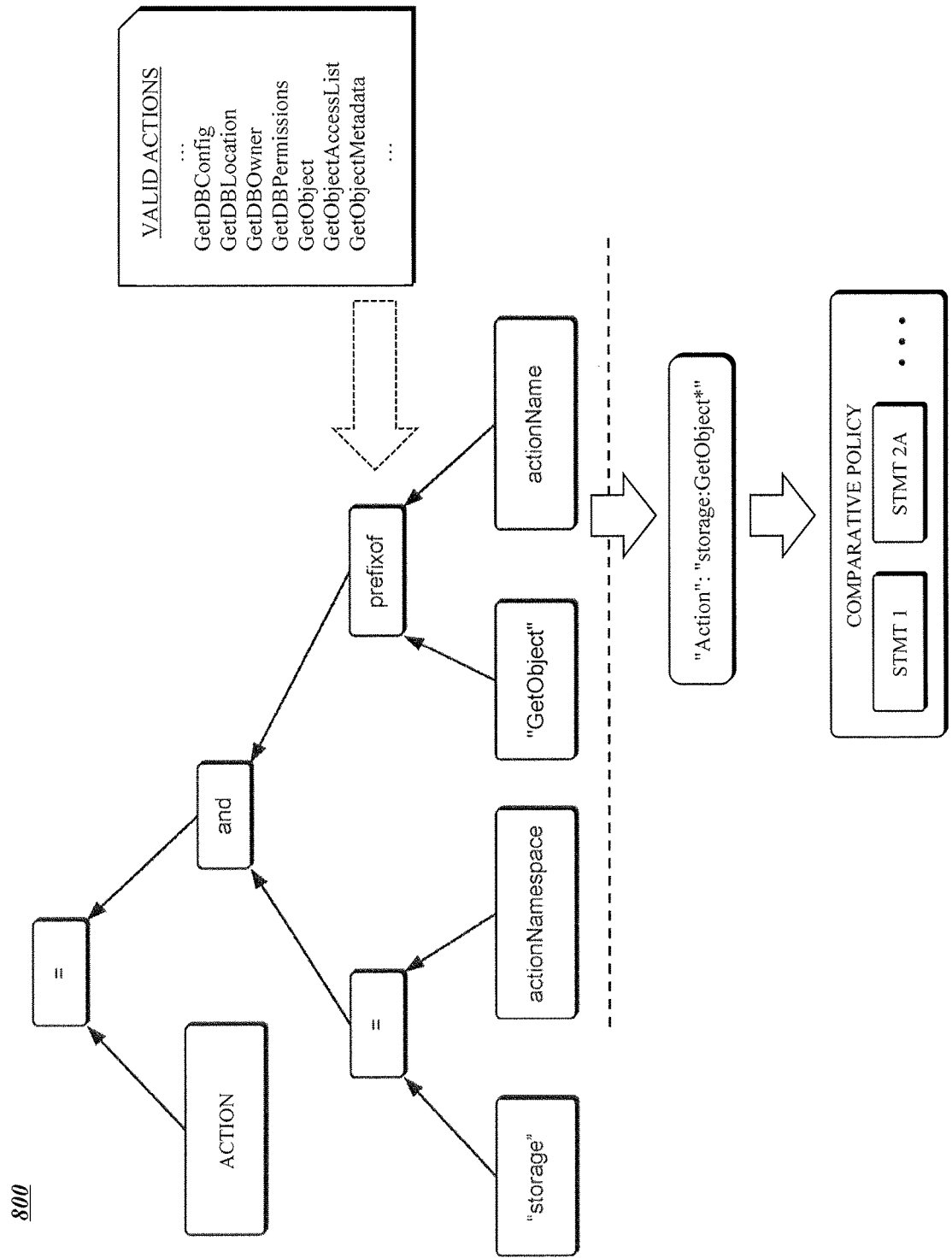

FIG. 8 shows an illustrative example of a diagram 800 illustrating the use of the propositional logic expression generated in accordance with FIG. 7 to produce a new "Action" constraint that can be incorporated into a comparative policy statement. Starting from the propositional logic expression of the "Get" action illustrated by the FIG. 7 diagram 700, a system (e.g., implementing the comparative policy generator described above) may locate the "str-.prefixof" constraint on the "actionName" parameter, and may retrieve the associated value "Get*." Detecting the wildcard after the "Get" prefix, the system may obtain a list of all valid values for the "actionName" parameter, and may then identify all of the values that have the prefix "Get," as illustrated. Using a selection method (e.g., random; round-robin; elimination; client-directed), the system may select the "GetObject" actionName. Then, the system may determine that "GetObject" is itself a prefix of several other actionNames; in response, the system may create a new constraint on "actionName," namely, that the "str.prefix" be equal to "GetObject." The system may produce a representative propositional logic expression with the following constraints:

(assert (=policy.action (or (and (="storage" action-Namespace) (str.prefixof "GetObject" actionName)))))

This propositional logic expression may then be translated to the action element below the dotted line in the diagram 800; specifically, the propositional logic having a constraint that is satisfied when the action has a "storage" namespace and an action name that has a string prefix of "GetObject" such as "GetObject" or "GetObjectAccessList" or "GetObjectMetadata," and so on, may be translated to the action element "storage:GetObject*," which may be added to a permission statement (e.g., STMT 2A) of the comparative policy being generated. The resulting comparative policy, to be compared to the example security policy provided above in connection with FIG. 7, may be:

```
Policy: {
   "Statement": [
      {
         "Effect": "Deny",
         "Principal":
         "Action": "storage:*",
         "Resource": "storage::examplebucket/*/private/*"
      },
      {
         "Effect": "Allow",
         "Principal": {"ID": "111122223333" },
         "Action": "storage:GetObject*",
         "Resource": "storage::examplebucket/*/uploads/*"
      }
   ]
}
```

Figure 9:
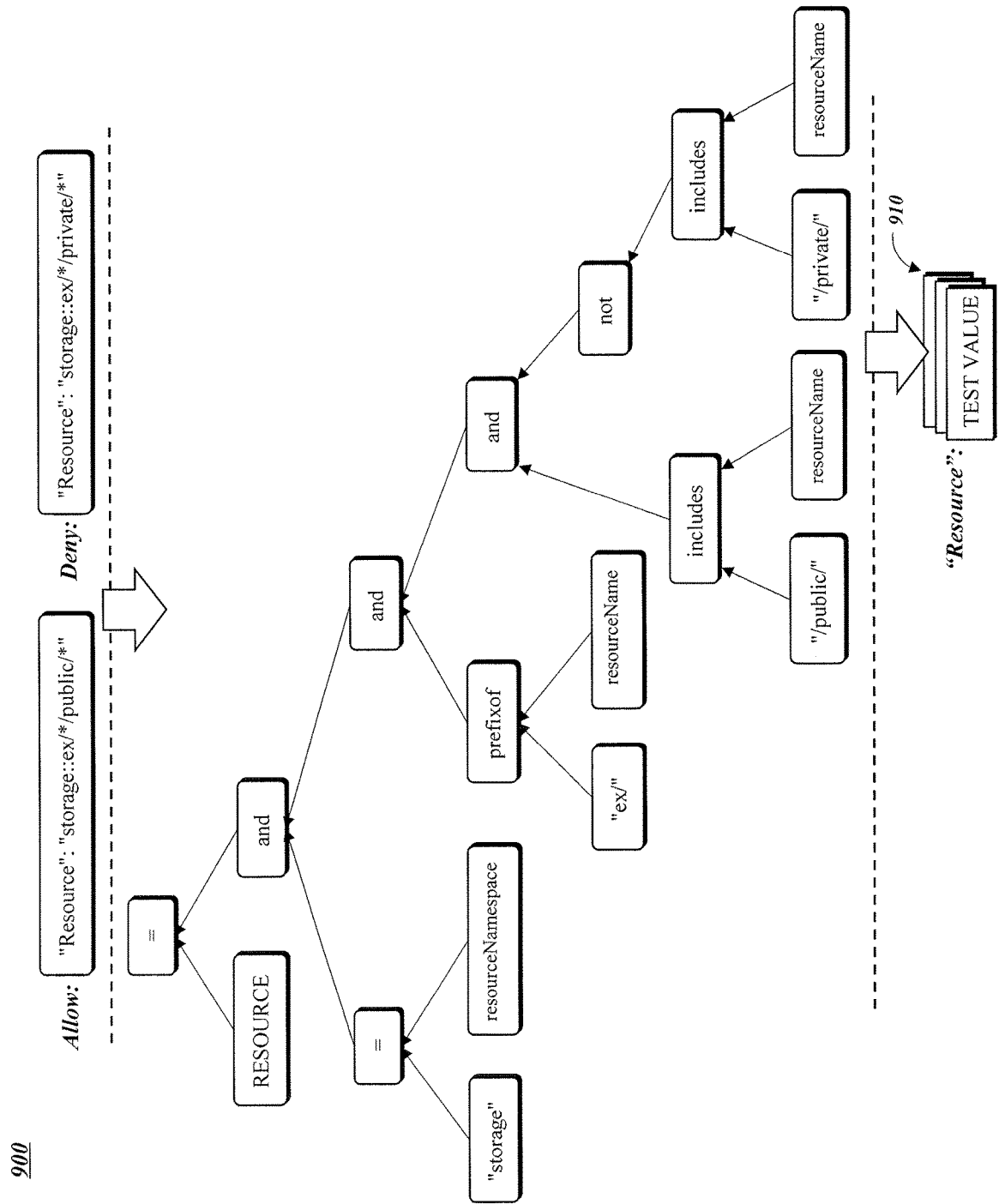
FIG. 9 is a diagram illustrating the use of propositional logic to generate test values for a resource context parameter.

FIG. 9 shows an illustrative example of a diagram 900 where an element (e.g., a "resource" element of a user-provided security policy) that is subject to different constraints from two permission statements in the policy is translated to a propositional logic and then to a series of test values 910 that can be added to request contexts (i.e., generated by a context generator as described above). The translation may be performed by any suitable component or combination of components, such as propositional logic translators and comparative policy generators discussed in connection with FIG. 1A. The diagram 900 illustrates an example where two JSON elements (shown above the dotted line) are translated to a propositional logic expression (shown below the dotted line). The propositional logic expression may be expressed in accordance with the SMT language which may be in accordance with one or more SMT LIB standards.

As an example, the illustrated corresponding resource elements of a permission statement that grants and a permission statement that denies (depending on the effect element of the permission statement) access to resources may be expressed as a propositional logic with the following constraints:

(assert (=policy.resource (or (and (="storage" resource-Service) (and (str.prefixof "ex/" resourceName) (and (str.includes "/public/" resourceName) (not (str.includes "/private/" resourceName))))))))

In other words, the resource element above the dotted line in the diagram 900 may be translated to a propositional logic having a constraint that is satisfied when the resource has a "storage" resource service namespace, the resource name/path begins with "ex/", and the resource name/path includes "/public/" and DOES NOT include "/private/". The test values 910 generated based on these constraints may include values that are expected to satisfy the constraints (thus being grantable, provided the other permission statement elements are satisfied) and/or values that are expected to fail to satisfy the constraints, including values 910 that are slight variations on each other but are expected to produce different results (i.e., grant vs. deny).

Figure 10:
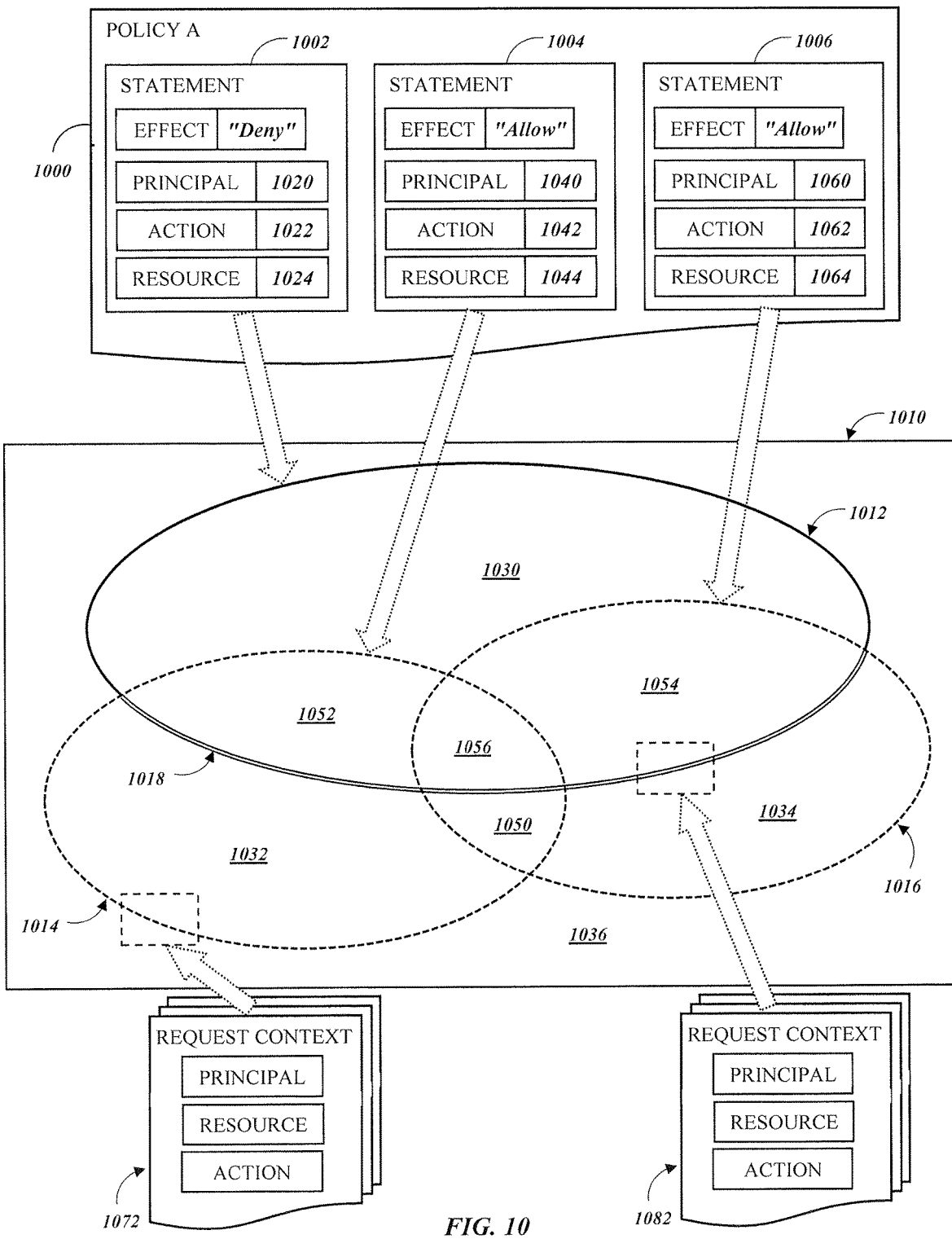
FIG. 10 is a diagram illustrating the generation of complete resource contexts to evaluate allow/deny boundaries represented by a security policy.

In some embodiments, the interpretation of permissions in a security policy as propositional logic formulae enables the present systems and methods to determine a boundary of a permission, as well as the intersection of boundaries of two or more permissions; further, a system may evaluate the behavior of so-called "edge cases" at the boundary or within an overlapping region of two or more permissions. FIG. 10 presents a visual representation of this concept: a security policy 1000 has one "deny" permission statement 1002 and two "allow" permission statements 1004, 1006; the policy 1000 is represented in a "field" 1010 of all possible combinations of values for one or more of the request context parameters by the boundaries 1012, 1014, 1016 of the policy's 1000 permission statements 1002-1006. That is, subject to resolution (according to preset policies, such as "explicit denials take priority") of conflicts between statements: a request to allow a principal 1020 to perform an action 1022 on a resource 1024 falls within the boundary 1012 of statement 1002 and is explicitly denied; a request to allow a principal 1040 to perform an action 1042 on a resource 1044 falls within the boundary 1014 of statement 1004 and is granted; a request to allow a principal 1060 to perform an action 1062 on a resource 1064 falls within the boundary 1016 of statement 1006 and is granted; and, a request having request context parameter values that do not match any of the statements 1002-1006 falls outside of the statements' boundaries 1012-1016 (i.e., in region 1036) and is treated according to implicit policies (e.g., implicit denial of request that is not expressly allowed).

However, the boundaries 1012-1016 intersect each other and therefore define overlapping regions 1050, 1052, 1054, 1056; requests that fall in these regions 1050-1056 satisfy at least two statements that may treat the request different (i.e., one may grant and another may deny), and the system may follow rules that resolve such conflicts. For example, contexts may be allowed by the illustrated policy 1000 if they match at least one of the allow statements 1004, 1006 and do not match the deny statement 1002. This creates two interesting test boundaries. One test boundary is between the allowed contexts and the implicitly denied contexts (i.e., boundaries 1014, 1016 of the allow statements 1004, 1006 that are outside of the boundary 1012 of the deny statement 1002); here, the system can generate request contexts 1072 that elucidate the test boundary. To elucidate the test boundary, the generated contexts 1072 may colloquially be considered "just barely" allowed (i.e., falling in one of the regions 1032, 1034, 1050, 1052, 1054, 1056 inside the "allow" boundaries 1014, 1016) or "just barely" denied (i.e., falling in the implicitly denied region 1036), meaning that a change to the value of a single request context parameter is enough to shift the request context 1072 to the other side of the test boundary.

The second test boundary 1018 is the portion of the deny statement's boundary 1012 that falls within the boundaries 1014, 1016 of the allow statements 1004, 1006. Here again the system can generate request contexts 1082 "just barely" on either side of this boundary 1018 (i.e., falling in one of the "allow" regions 1032, 1034, 1050 or in the overlapping "deny" regions 1052, 1054, 1056), meaning that a change to the value of a single request context parameter is enough to shift the request context 1082 to the other side of the test boundary. In some embodiments, the system may continue generating (e.g., by iterating the context generation methods described below) these "edge case" request contexts 1072, 1082 for any permission statement or any combination of statements, so that a complete and/or useful representation of the policy boundaries emerges.

The non-limiting example security policy provided above to describe FIGS. 7-9 can further demonstrate the concepts of FIG. 10. The policy has one deny statement and one allow statement that intersect; thus, in an environment where non-allowed requests are implicitly denied, the policy contains two interesting boundaries. The boundary between the "allow" statement and the implicitly denied region may be elucidated using complete request contexts such as:
{
    "Principal": "111122223333",
    "Action": "storage:GetObject",
    "Resource": "storage::examplebucket/Pfpt/uploads/2rEV"
}
{
    "Principal": "111122223334",
    "Action": "storage:GetObject",
    "Resource": "storage::examplebucket/9FE3k/uploads/0CuVrym"
}
{
    "Principal": "111122223333",
    "Action": "storage:PutObject",
    "Resource": "storage::examplebucket/MA3F0/uploads/xDDLP"
}
{
    "Principal": "111122223333",
    "Action": "storage:PutObject",
    "Resource": "storage::examplebucket/Hffev/uloads/LNNT"
}
Of these example complete request contexts, the first should be allowed and the rest denied for the reasons highlighted. The boundary between the "allow" and "deny" statements may be elucidated using complete request contexts such as:
{
    "Principal": "111122223333",
    "Action": "storage:GetObject",
    "Resource": "storage::examplebucket/GVmk/uploads/d16/private/3Vj"
}
{
    "Principal": "111122223333",
    "Action": "storage:GetObject",
    "Resource": "storage::examplebucket/KNeH/private/z6R/uploadsaXpKnt"
}
{
    "Principal": "111122223333",
    "Action": "storage:GetObject",
    "Resource": "storage::examplebucket/56M/uploads/dweGiv/prvate/afUP"
}
{
    "Principal": "111122223333",
    "Action": "storage:GetObject",
    "Resource": "storage::examplebucket/Gu4Ugw/priv8ate/5ltYqDK/uploads/AbUS9ne"
}
Of these examples, the first two request contexts should be denied and the second two allowed for the reasons highlighted.

The system may deliver the generated contexts to the policy owner, enabling the owner to better understand the policy, and particularly to run tests which may result in surprising behavior, e.g. during penetration testing. The system may further extend these boundary-defining concepts to perform more sophisticated context generation, such as based on the relationship among multiple security policies. For example, the system can generate contexts that are "just barely" denied by one policy and "just barely" accepted by another policy. The system effectively traces the boundaries within two different policies simultaneously and identifies subtle differences between them via generation of complete request contexts. This approach has particular application to policy revisions: the system may evaluate the boundaries of a new version of the policy and its previous version, and reveal progressions and/or regressions of policy coverage based on the relative movement of the respective boundaries. In another example, the system may obtain data describing previously-received and/or processed requests; the system may evaluate the previous requests against a new or existing policy, and identify which requests have requests contexts that fall along the interesting test boundaries.

Figure 11:
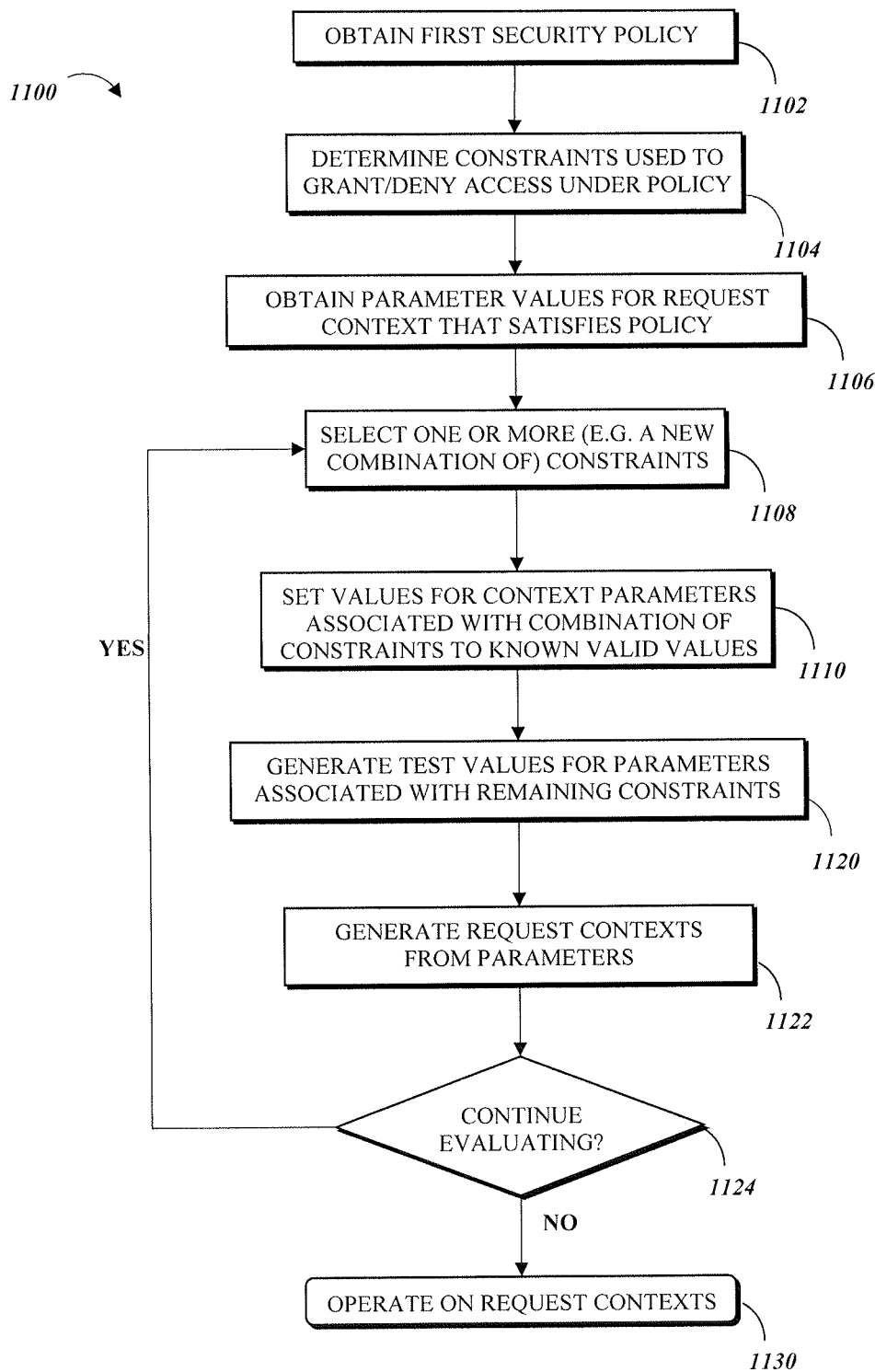
FIG. 11 is a flowchart of an example method of iteratively generating request contexts for a security policy in accordance with the present disclosure.

FIG. 11 illustrates an example method 1100 executable by a system, in accordance with the present disclosure, to evaluate the validity and coverage of a security policy by iteratively generating complete request contexts based on information in the security policy. At 1102, the system may obtain the security policy to be evaluated. For example, a user of the computing resource service provider may provide the security policy to the system via one or more user interfaces, as described above. In some embodiments, the system may receive information associated with the user's account; the information may specify a first security policy for controlling access to one or more computing resources provided by the computing resource service provider and associated with the user account, such as by encoding a first set of security permissions for accessing the computing resource. At 1104, the system may determine the constraints that are described by the policy for granting and/or denying access to the computing resource. For example, the system may obtain a first set of constraints corresponding to access grants of the first security policy and/or a second set of constraints corresponding to access denials of the first security policy. The constraints may, in some embodiments, be determined from permission statements in the security policy; for example, the constraints may include expressions for one or more of the effect, the principal(s), the action(s), the target resource(s), and any conditions pertaining to the data in the request for access.

At 1106, the system may obtain parameter values for one or more of the request context parameters, which values together compose a request context that satisfies the policy. For example, the policy may state a user identifier as the value for "principal," the system may obtain the user identifier from the policy and store it as a valid parameter value; the system may repeat this for all constraints or a subset thereof in order to obtain a set of valid parameter values. In another example, the policy may state an expression as the value for a constraint, which expression includes wildcards; the system may generate a valid value for the parameter by creating a string that matches the pattern of the expression. The valid values may be stored for later use in the method 1100.

At 1108, the system may select one or a combination of the constraints to set to a fixed valid value for the present iteration. For example, the system may select the principal and action to be held constant. At 1110, the system may set the values for the selected parameters to known valid values (e.g., the values determined at 1106). At 1120, the system may generate test values for the remaining constraints. In some embodiments, the test values may be based on the permission statements in the policy. Additionally or alternatively, the test values may be based on known valid (and/or known invalid) values for the corresponding constraint. At 1122, the system may generate one or more request contexts based on the values selected for the constraints. For example, the system may set the principal and action to fixed, valid values, and may generate a plurality of test values for the resource constraint; the system may generate a request context for each of the test values generated. In some embodiments, the request contexts each comprise unique corresponding values for a set of context parameters required by the first security policy; and the request contexts may be "complete," such that a simulation of applying the first security policy to a request for access to the one or more computing resources, the request comprising any of the plurality of request contexts, produces a result indicating whether the request is granted or denied.

At 1124, the system may determine whether it should iterate the context generation loop, by returning to 1108 to select a new combination of constraints to hold constant so that another set of unique test values, and therefore another set of complete request contexts, may be generated. In some embodiments, the system may determine whether to keep iterating based on the number of contexts already generated. Additionally or alternatively, the system may determine whether to continue by causing the generated contexts to be simulated, as described further below, to determine whether a target for valid new contexts has been reached. If the system determines that the evaluation is complete, at 1130 the system may perform additional operations on the request contexts, such as simulating them (as described below), delivering them to the user, etc.

Figure 12:
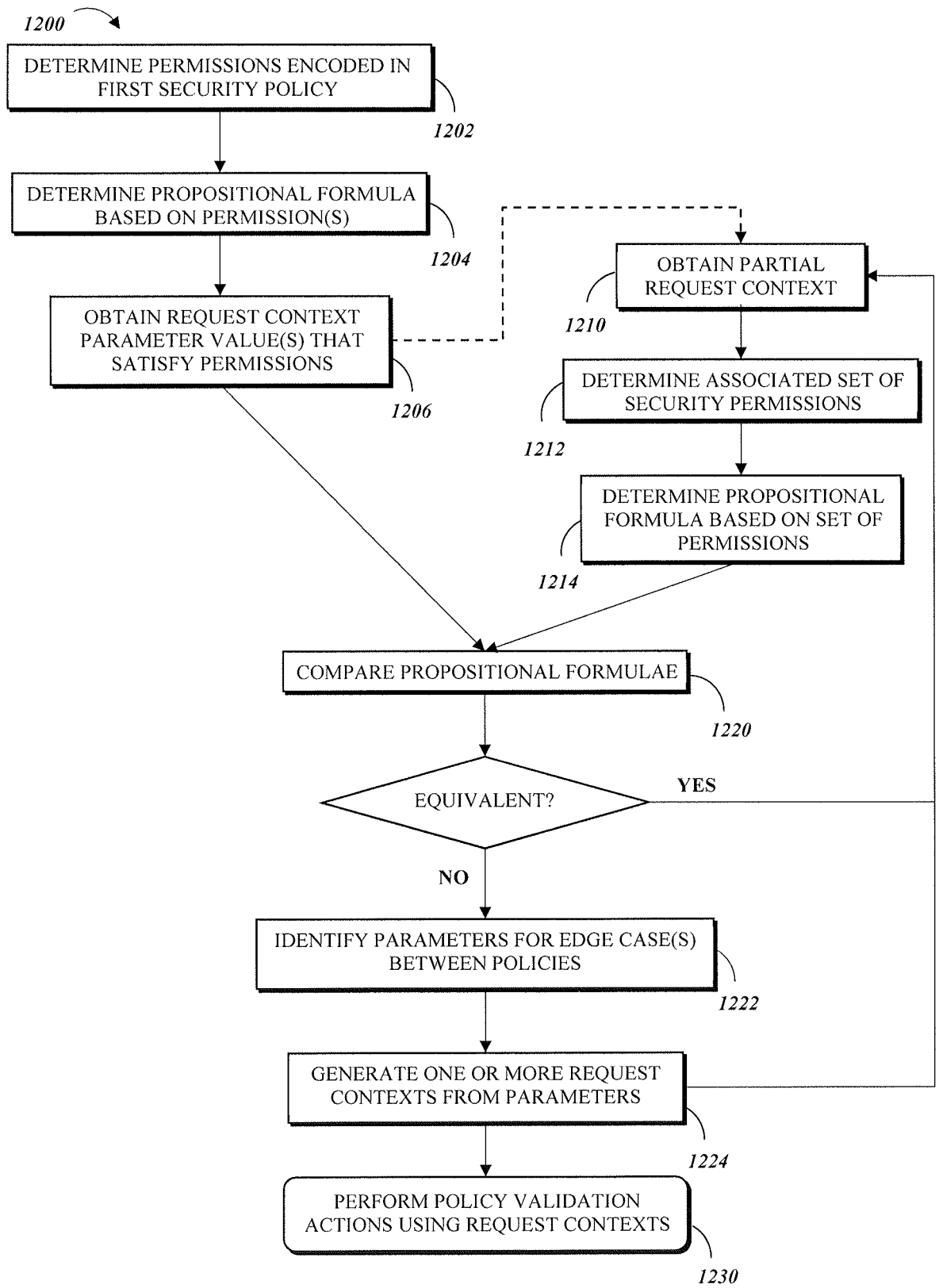
FIG. 12 is a flowchart of another example method of iteratively generating request contexts for a security policy in accordance with the present disclosure.

FIG. 12 illustrates another example method 1200 executable by a system, in accordance with the present disclosure, to evaluate the validity and coverage of a security policy by iteratively generating complete request contexts based on information in the security policy. At 1202, the system may determine a first set of security permissions encoded in the security policy. For example, the system may receive information identifying the security permissions. At 1204, the system may determine a first propositional logic expression based at least in part on the first set of security permissions. At 1206, the system may obtain valid (i.e., satisfying the permissions, as described above) values for one, some, or all of the request context parameters. For example, the system use the propositional logic expression as described above to determine the valid values. These values may be used to generate a partial request context.

At 1210, the system may obtain a first partial request context. This partial request context may comprise at least a first parameter (i.e., of the set of request context parameters) and a corresponding first value of the first parameter that satisfies the first set of security permissions. In some embodiments, the system may use one or more of the valid values obtained at 1206 to generate the partial request context. In another example, the system may not use the values from 1206, and may instead generate the partial request context from another request context, such as a previously generated context or a context from a previously received request. Additionally or alternatively, the system may generate the partial request context from a second security policy, such as a previous version of the first security policy. At 1212, the system may determine a second set of security permissions that is encoded in or based on the partial request context. For example, the system may generate a comparative policy from the partial request context, as described above. In some embodiments, the first and second sets of security permissions may both require the request to include the first parameter set to the corresponding first value in order to grant access to the computing resource in response to the request. At 1214, the system may determine a second propositional logic expression based at least in part on the second set of security permissions.

The first and second propositional logic expressions may comprise or belong to respective propositional formulae representing the permissions of the first security policy and a comparative security policy. At 1220, the system may compare these propositional formulae to each other to determine whether the policies are equivalent, or non-equivalent, or one is more or less permissive than the other. If the policies are equivalent, there is no need to generate further request contexts for the present partial request context, and the system may return to 1210. If the policies are not equivalent, at 1222 the system may identify a first set of parameter values, each parameter of the set of request context parameters being associated with a corresponding parameter value of the first set of parameter values, that represents an "edge case" between the two policies—that is, the first set of parameter values are sufficient to determine the first propositional logic expression and the second propositional logic expression lack equivalency such that applying the first security policy to the first set of parameter values results in a grant of access to the computing resource and applying the comparative policy (comprising the second set of security permissions) to the first set of parameter values results in a denial of access to the computing resource.

At 1224, the system may generate one or more complete request contexts from the set of parameters. At 1230, the system may then perform various actions using or based on the request contexts. For example, the system may validate the security policy by simulating the request contexts and prompting the user to indicate whether the examination results are desired, as described herein. Additionally, in some embodiments the system may concurrently or alternatively iterate the request context generation sub-method by returning from 1224 to 1210 to obtain a new partial context and corresponding comparative policy usable to generate additional unique parameter value sets and corresponding request contexts.

Figure 13:
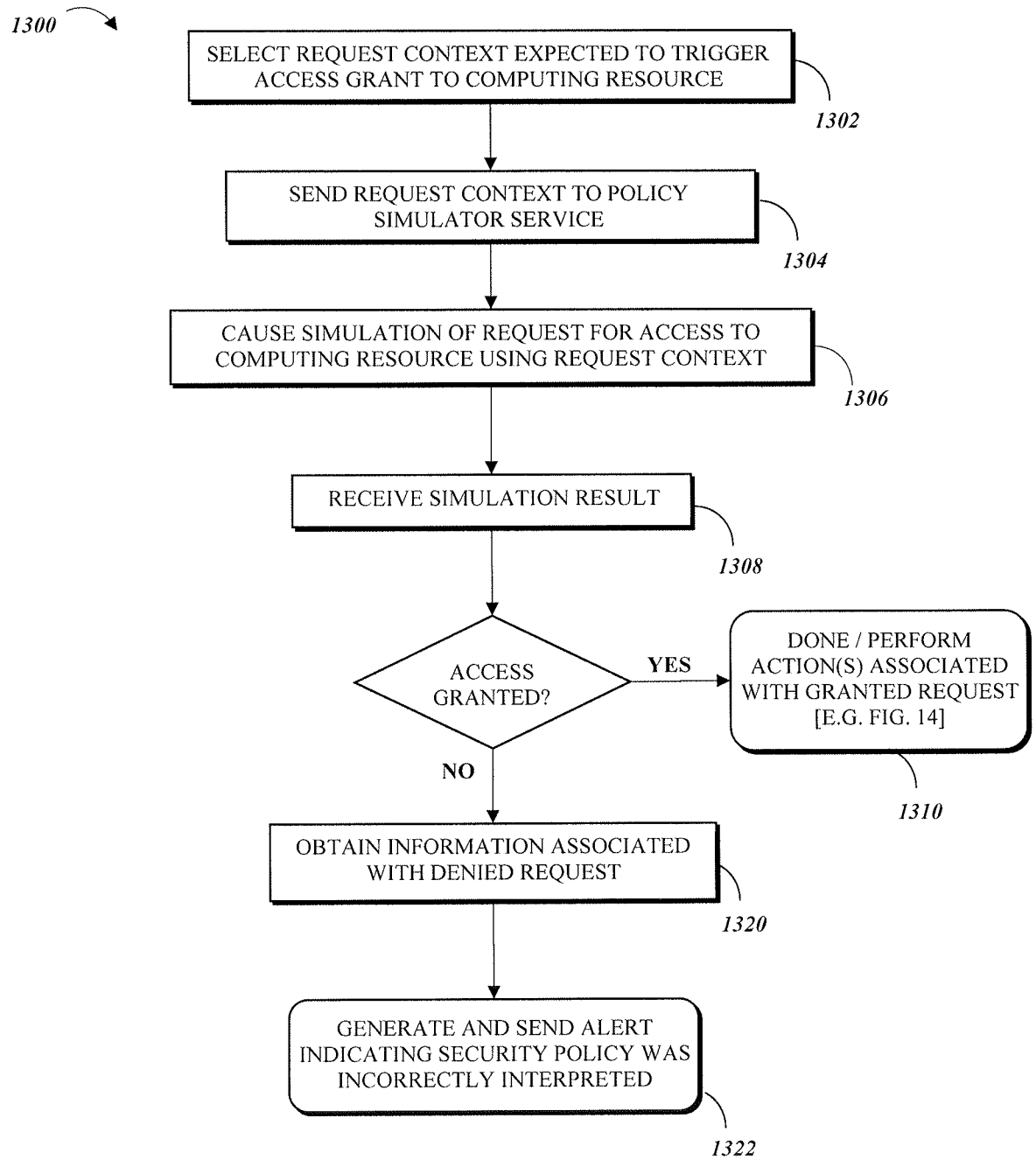
FIG. 13 is a flowchart of an example method of simulating a request for access using a generated request context.

FIG. 13 illustrates an example method 1300 for validating the system's own interpretation of the security policy (i.e., as obtained through propositional logic comparisons in the methods described above). At 1302, the system selects or obtains one of the complete request contexts it generate (e.g., from the methods 1100, 1200 above). At 1304, the system may simulate the application of the security policy to a request having the selected request context. For example, the system may send the request context (or may generate an example request having the request context and send the example request) to a policy simulator service (e.g., implemented by the computing resource service provider). At 1306, the system may cause the policy simulator service to simulate requesting access to the computing resource, within a suitable computing environment (e.g., a virtual computing environment of the policy owner) of the computing resource service provider, using the example request. At 1308, the system may obtain a simulation result. If the simulation result is a grant of access to the computing resource, as expected, at 1310 the system may continue processing the request context or otherwise complete the method 1300. If the result indicates that a simulated application, by the policy simulator service, of the first security policy to the example request resulted in a denial of access to the computing resource, at 1320 the system may obtain corresponding information describing the denial of the request, and at 1322 the system may generate an alert and send the alert to an administrative user of the computing resource service provider, the alert indicating that the first security policy was incorrectly interpreted.

Figure 14:
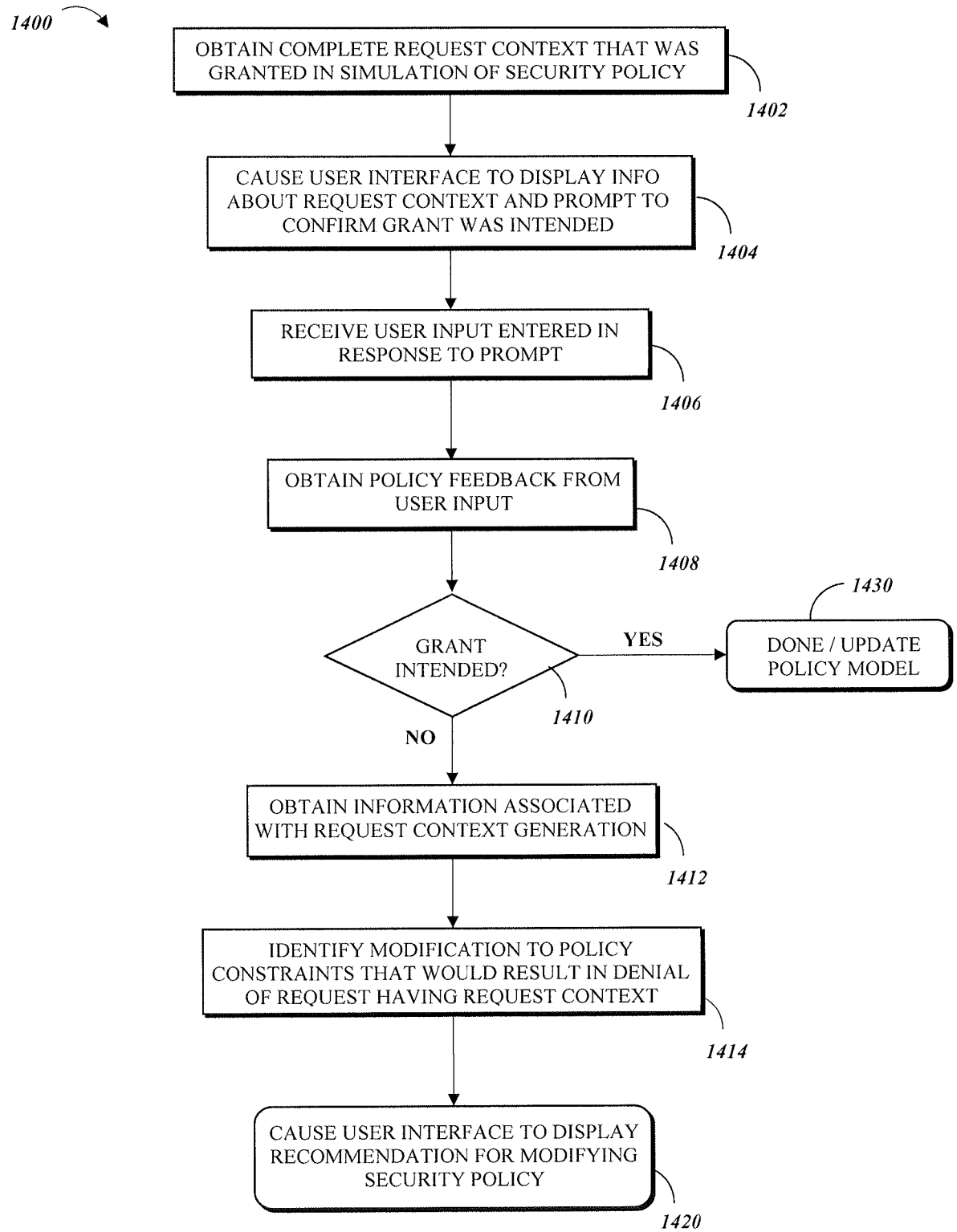
FIG. 14 is a flowchart of an example method of interacting with a user to identify potential improvements to a security policy.

FIG. 14 illustrates an example method 1400 of interacting with the policy owner to determine whether a generated valid request context was intended to be granted access to the computing resource under the security policy. At 1402, the system may select or obtain one of the complete request contexts that the system generated (e.g., via methods 1100, 1200 above) and then simulated (e.g., as in method 1300 above) to determine that a request having the selected request context would be granted. At 1404, the system may cause a user interface, such as a console that the policy owner used to provide the security policy to the system, to display information describing the selected request context. For example, the user interface may show the request context parameters and the generated value for each, along with an indication that the security policy grants a request having the selected request context. The user interface may further display a prompt requesting that the user indicate whether or not the grant was intended. The prompt may enable the user to, for example, select "yes" or "no" and submit the response, which is packaged and sent as user input to the computing devices of the system.

At 1406, the system may receive the user input, and at 1408 the system may obtain, as policy feedback, the response to the prompt from the user input. At 1410, the system may read the response to determine whether the grant of access was intended. If so, at 1430 the system may store the feedback, update the policy model with the confirmatory input, and/or otherwise complete the method 1400. If the response indicates the grant was not intended, at 1412 the system may obtain additional information associated with the generation of the selected request context. Such information may include the partial request context, comparative policy, propositional logic formula/expression(s), past request data, and/or any other information that was used to generate the selected request context. Based at least in part on some or all of this information, at 1414 the system may identify one or more modifications to the policy that would result in denial of the example request (i.e., having the selected request context). For example, the system may determine that the second set of security permissions resolved from the second/comparative policy are more restrictive than the first set of security permissions resolved from the owner's policy. At 1420, the system may provide, via the user interface, a recommendation for modifying the first security policy to be less permissive.

Figure 15:
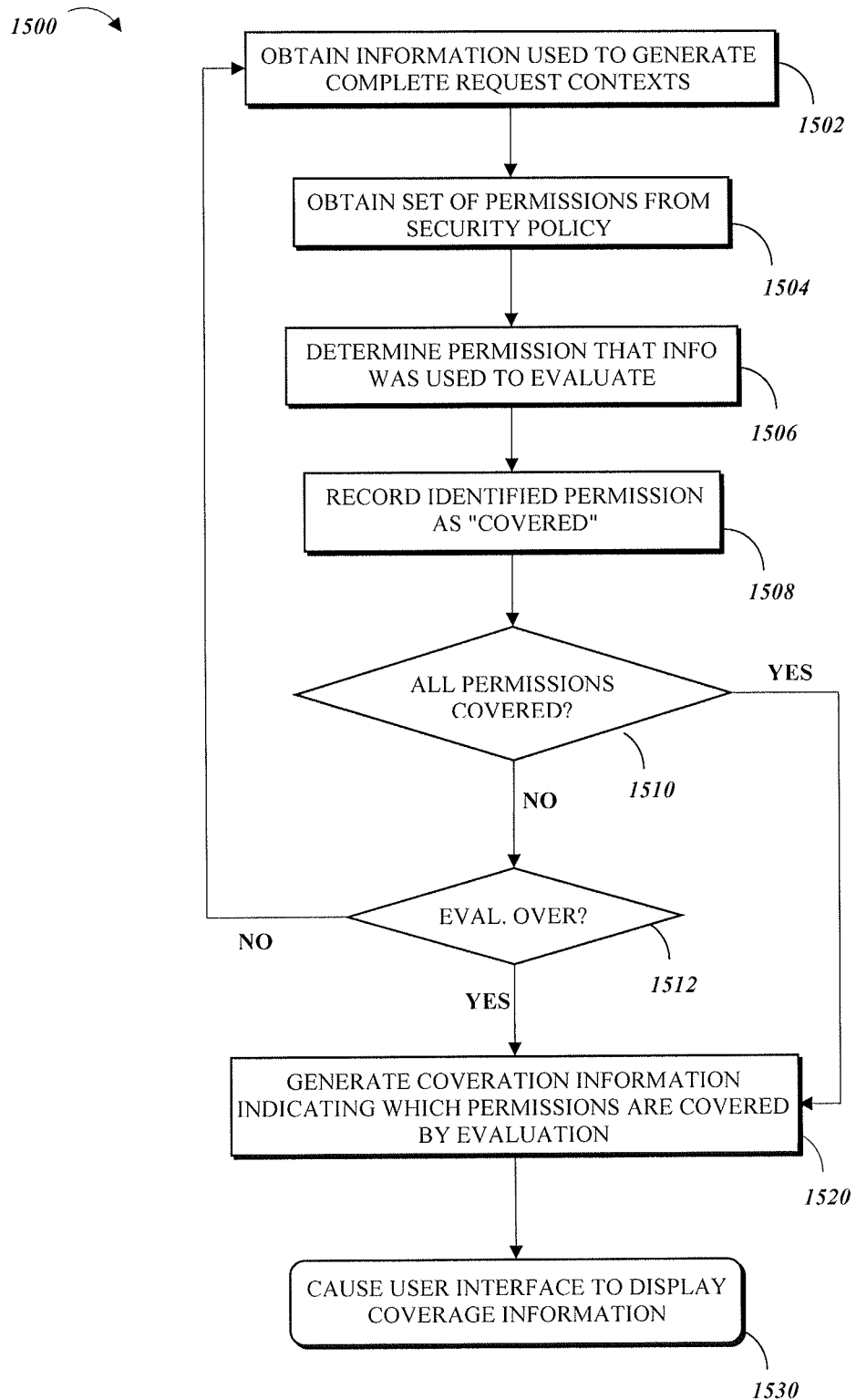
FIG. 15 is a flowchart of an example method of providing information to a user describing the coverage of an evaluation of a security policy.

FIG. 15 illustrates an example method 1500 for providing information describing the "coverage" of the system's evaluation of the security policy. The coverage information may be provided as standalone information or together with the generated complete request contexts. At 1502, the system may obtain information used to generate all or a portion of the complete request contexts, as described above with respect to FIG. 14. At 1504, the system may obtain the set of permissions contained in the security policy. At 1506, based on the information describing the request context generation, the system determines which of the permission(s) were evaluated to produce the request contexts. At 1508, the system may record the identified permission(s) as "covered"—that is, the evaluation included that/ those permission(s). At 1510, the system determines whether all of the permissions in the security policy have been marked as "covered." If so, the system may skip to 1520. If not, at 1512 the system determines whether the evaluation is still being performed; if the evaluation is not over, the system, after generating more request contexts, returns to 1502. Once the evaluation is complete, at 1520 the system generates coverage information indicating which of the permissions were covered by the evaluation. For example, the system may report a coverage percentage, and/or may expressly identify the permissions that were and/or were not covered. The coverage information may, in some embodiments, identify the combinations of constraints that were evaluated. At 1530, the system may cause a user interface to display the coverage information. For example, the system may send the coverage information, together with other information generated during the evaluation (e.g., request contexts, simulation results, policy modification recommendations), to the user interface for display on the client computing device.

Thus, in one aspect, this disclosure provides a system including one or more processors and memory storing computer-executable instructions that, when executed by the one or more processors, cause the system to: receive information associated with a user account of a computing resource service provider, the information specifying a first security policy encoding a first set of security permissions for accessing a computing resource provided by the computing resource service provider and associated with the user account; obtain a first partial request context comprising a first parameter, of a set of request context parameters describing a request for access to the computing resource, and a corresponding first value of the first parameter that satisfies the first set of security permissions; determine a second set of security permissions for accessing the computing resource, the first and second sets of security permissions both requiring the request to include the first parameter set to the corresponding first value in order to grant access to the computing resource in response to the request; determine a first propositional logic expression based at least in part on the first set of security permissions; determine a second propositional logic expression based at least in part on the second set of security permissions; identify a first set of parameter values, each parameter of the set of request context parameters being associated with a corresponding parameter value of the first set of parameter values, the first set of parameter values being sufficient to determine the first propositional logic expression and the second propositional logic expression lack equivalency such that applying the first security policy to the first set of parameter values results in a grant of access to the computing resource and applying a second security policy, comprising the second set of security permissions, to the first set of parameter values results in a denial of access to the computing resource, the first set of parameter values associating the first value with the first parameter; and, perform an action associated with validating the first security policy based on the first set of parameter values.

Executing the instructions further causes the system to: cause a policy simulator service to simulate requesting access to the computing resource, within a computing environment of the computing resource service provider, using an example request comprising an example request context defined by the first set of parameter values; and obtain a simulation result indicating that a simulated application, by the policy simulator service, of the first security policy to the example request resulted in a denial of access to the computing resource; wherein to perform the action, the instructions, when executed, cause the system to generate an alert and send the alert to an administrative user of the computing resource service provider, the alert indicating that the first security policy was incorrectly interpreted. The information specifying the first security policy is received via a user interface, and to perform the action, the instructions, when executed, cause the system to: provide, to a user associated with the user account via the interface, an indication that the first security policy grants an example request comprising an example request context defined by the first set of parameter values; receive, via the interface, user input entered by the user in response to viewing the indication; determine that the user input comprises policy feedback indicating that the user does not intend for the first security policy to allow access requests having the example request context; and provide, via the user interface, a recommendation for modifying, based on the second set of security permissions, the first security policy to be less permissive.

The set of request context parameters further includes a second parameter and a third parameter and identifies a requested action to be performed, a target resource on which the requested action is to be performed, and a principal that will perform the requested action. To perform the action, the instructions, when executed, cause the system to: determine, from the first set of parameter values, a corresponding second value associated with the second parameter; obtain a second partial request context comprising the first parameter and the corresponding first value, and the second parameter and the corresponding second value; determine a third set of security permissions for accessing the computing resource, the third set of security permissions requiring the request to include the first parameter set to the corresponding first value and the second parameter set to the corresponding second value in order to grant access to the computing resource in response to the request; determine a third propositional logic expression based at least in part on the third set of security permissions; identify a second set of parameter values each associated with the third parameter, and each being sufficient to determine that the first propositional logic expression and the third propositional logic expression lack equivalency such that applying the first security policy to an example access request, wherein the corresponding request context is defined by the first value, the second value, and any of the second set of parameter values, results in a grant of access to the computing resource, and applying a third security policy, comprising the third set of security permissions, to the example access request results in a denial of access to the computing resource; and, generate a set of complete request contexts each comprising the first parameter and the corresponding first value, the second parameter and the corresponding second value, and the third parameter and a corresponding third value selected from the second set of parameter values.

In another aspect, this disclosure provides a system including one or more processors and memory storing computer-executable instructions that, when executed by the one or more processors, cause the system to: receive information associated with a user account of a computing resource service provider, the information specifying a first security policy for controlling access to one or more computing resources provided by the computing resource service provider and associated with the user account; obtain a first set of constraints corresponding to access grants of the first security policy; obtain a second set of constraints corresponding to access denials of the first security policy; generate a plurality of combinations of two or more constraints from one or both of the first set of constraints and the second set of constraints; and generate, based on the plurality of combinations, a plurality of request contexts each comprising unique corresponding values for a set of context parameters required by the first security policy, such that a simulation of applying the first security policy to a request for access to the one or more computing resources, the request comprising any of the plurality of request contexts, produces a result indicating whether the request is granted or denied. Executing the instructions may further cause the system to generate coverage information describing each of the plurality of combinations, and to provide, to a user associated with the user account via a user interface, the coverage information and the plurality of request contexts.

Executing the instructions may further cause the system to obtain a second security policy for controlling access to the one or more computing resources, and identify, as a set of edge-case contexts, each request context of the plurality of request contexts that, when used in the request, causes the first security policy and the second security policy to produce, in response to the request, respective access decisions that are not equivalent. The first security policy may include a modification of the second security policy, and executing the instructions further causes the system to: determine whether the set of edge-case contexts includes one or more regressive contexts that, when used in the request, cause the first security policy to grant access to the one or more computing resources in response to the request, and cause the second security policy to deny access to the one or more computing resources in response to the request; and, responsive to a determination that the set of edge-case contexts includes one or more regressive contexts, provide, to a user associated with the user account via a user interface, regression information indicating that the first security policy is at least partially more permissive than the second security policy, along with the one or more regressive contexts. The instructions, when executed, may further cause the system to: obtain a first partial request context comprising a first value for a first parameter of the set of request context parameters, the first value satisfying the first set of constraints with respect to the first parameter; and, generate the second security policy based on the first partial request context, the second security policy requiring a corresponding request context of an access request to have the first value for the first parameter in order to grant access to at least a first computing resource of the one or more computing resources in response to the access request.

Executing the instructions may further cause the system to: determine a first propositional logic expression based at least in part on a first set of security permissions encoded in the first security policy; determine a second propositional logic expression based at least in part on a second set of security permissions encoded in the second security policy; and, to identify the set of edge-case contexts, identify a set of parameter values, associated with the set of request context parameters, that is sufficient to determine the first propositional logic and the second propositional logic lack equivalency such that applying the first security policy to the set of parameter values results in a denial of access to a first computing resource associated with the set of parameter values, and applying the second security policy to the set of parameter values results in a grant of access to the first computing resource. Executing the instructions may further cause the system to: obtain a third set of constraints corresponding to access grants of the second security policy; obtain a fourth set of constraints corresponding to access denials of the second security policy; and, to determine the first propositional logic and the second propositional logic lack equivalency, determine, using a satisfiability modulo theories (SMT) solver, whether the first, second, third, and fourth sets of constraints are satisfiable. Executing the instructions may further cause the system to: obtain, based on the set of edge-case contexts, a partial request context comprising a first value for a first parameter of the set of request context parameters, the first value satisfying the first set of constraints with respect to the first parameter; generate a third security policy based on the partial request context, the third security policy requiring a corresponding request context of an access request to have the first value for the first parameter in order to grant access to at least a first computing resource of the one or more computing resources in response to the access request; and generate, in the set of edge-case contexts and based on the plurality of combinations, a plurality of additional request contexts each comprising unique corresponding values for the set of context parameters, the plurality of additional request contexts each, when used in the request, causing the first security policy and the third security policy to produce, in response to the request, respective access decisions that are not equivalent.

To generate the plurality of request contexts, executing the instructions may cause the system to: access a data store storing usage data associated with the user account; obtain, from the data store, request data describing previous requests to access the one or more computing devices; and, generate the plurality of request contexts based on the request data.

In still another aspect, this disclosure provides a system including one or more processors and memory storing specific computer-readable program instructions that, when executed by the one or more processors, cause the system to: receive, via a user interface, information associated with a user account of a computing resource service provider, the information specifying a first security policy for controlling access to one or more computing resources provided by the computing resource service provider and associated with the user account; obtain a first set of constraints corresponding to access grants of the first security policy; generate, based on a plurality of combinations of constraints in the first set of constraints, a plurality of request contexts each comprising unique corresponding values for a set of context parameters evaluated using the first security policy to determine whether to grant or deny a request for access to the one or more computing resources, the request comprising any of the plurality of request contexts; and provide, via the user interface, information describing the plurality of request contexts. Executing the instructions may further cause the system to: generate a plurality of simulation results each associated with a corresponding request context of the plurality of request contexts, and each indicating whether a simulated request comprising the corresponding request context is granted or denied by the first security policy; and, include the plurality of simulation results in the information describing the plurality of request contexts. Executing the instructions may further cause the system to: provide, via the user interface with the information describing the plurality of request contexts, a prompt requesting an indication from the user whether each of the plurality of simulation results is a desired result for the corresponding request context; receive user input entered into the user interface; determine that the user input comprises a response to the prompt; determine whether the response identifies one or more of the plurality of simulation results as inaccurate results; responsive to a determination that the response does not identify one or more of the plurality of simulation results as inaccurate results, validate the first security policy; and, responsive to a determination that the response identifies one or more inaccurate results, perform one or more actions associated with recommending modifications to the first security policy.

Executing the instructions may further cause the system to: determine that first security policy comprises a modification of a previous security policy; obtain a second set of constraints corresponding to access grants of the previous security policy; and, to generate the plurality of request contexts, determine, based on the first and second sets of constraints, one or more sets of values corresponding to the set of request context parameters, each of the one or more sets of values, when used in the request, causing the first security policy to grant access to the one or more computing resources in response to the request, and causing the previous security policy to deny access to the one or more computing resources in response to the request. Executing the instructions may further cause the system to include, in the information describing the plurality of request contexts, one or more of: a first annotation to be displayed in the user interface, the first annotation indicating that a first element of a first parameter of the set of request context parameters has a custom value that can be changed by a requestor; and, a second annotation to be displayed in the user interface, the second annotation indicating that a second element of the first parameter has a fixed value that is not modifiable by the requestor.

Executing the instructions may further cause the system to: receive via the user interface, user input associated with the first security policy; determine that the user input comprises a request for a set of valid request contexts that each trigger one of the access grants of the first security policy; and generate, as the plurality of request contexts, the set of valid request contexts. Executing the instructions may further cause the system to: determine that the user input further comprises a first value for a first parameter of the set of request context parameters; and include, in each valid request context of the set of valid request contexts, the first value as a fixed value for the first parameter.

The various embodiments described herein can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising one or more processors and memory storing computer-executable instructions that, when executed by the one or more processors, cause the system to:

receive information associated with a user account of a computing resource service provider, the information specifying a first security policy encoding a first set of security permissions for accessing a computing resource provided by the computing resource service provider and associated with the user account;

obtain a first partial request context comprising a first parameter, of a set of request context parameters describing a request for access to the computing resource, and a corresponding first value of the first parameter that satisfies the first set of security permissions;

determine a second set of security permissions for accessing the computing resource, the first and second sets of security permissions both requiring the request to include the first parameter set to the corresponding first value in order to grant access to the computing resource in response to the request;

determine a first propositional logic expression based at least in part on the first set of security permissions;

determine a second propositional logic expression based at least in part on the second set of security permissions;

identify a first set of parameter values, each parameter of the set of request context parameters being associated with a corresponding parameter value of the first set of parameter values, the first set of parameter values being sufficient to determine the first propositional logic expression and the second propositional logic expression lack equivalency such that applying the first security policy to the first set of parameter values results in a grant of access to the computing resource and applying a second security policy, comprising the second set of security permissions, to the first set of parameter values results in a denial of access to the computing resource, the first set of parameter values associating the first value with the first parameter; and perform an action associated with validating the first security policy based on the first set of parameter values.

2. The system of claim 1, wherein executing the instructions further causes the system to:

cause a policy simulator service to simulate requesting access to the computing resource, within a computing environment of the computing resource service provider, using an example request comprising an example request context defined by the first set of parameter values; and obtain a simulation result indicating that a simulated application, by the policy simulator service, of the first security policy to the example request resulted in a denial of access to the computing resource;

wherein to perform the action, the instructions, when executed, cause the system to generate an alert and send the alert to an administrative user of the computing resource service provider, the alert indicating that the first security policy was incorrectly interpreted.

3. The system of claim 1, wherein the information specifying the first security policy is received via a user interface, and to perform the action, the instructions, when executed, cause the system to:

provide, to a user associated with the user account via the interface, an indication that the first security policy grants an example request comprising an example request context defined by the first set of parameter values;

receive, via the interface, user input entered by the user in response to viewing the indication;

determine that the user input comprises policy feedback indicating that the user does not intend for the first security policy to allow access requests having the example request context; and provide, via the user interface, a recommendation for modifying, based on the second set of security permissions, the first security policy to be less permissive.

4. The system of claim 1, wherein the set of request context parameters further includes a second parameter and a third parameter and identifies a requested action to be performed, a target resource on which the requested action is to be performed, and a principal that will perform the requested action, and to perform the action, the instructions, when executed, cause the system to:

determine, from the first set of parameter values, a corresponding second value associated with the second parameter;

obtain a second partial request context comprising the first parameter and the corresponding first value, and the second parameter and the corresponding second value;

determine a third set of security permissions for accessing the computing resource, the third set of security permissions requiring the request to include the first parameter set to the corresponding first value and the second parameter set to the corresponding second value in order to grant access to the computing resource in response to the request;

determine a third propositional logic expression based at least in part on the third set of security permissions;

identify a second set of parameter values each associated with the third parameter, and each being sufficient to determine that the first propositional logic expression and the third propositional logic expression lack equivalency such that applying the first security policy to an example access request, wherein the corresponding request context is defined by the first value, the second value, and any of the second set of parameter values, results in a grant of access to the computing resource, and applying a third security policy, comprising the third set of security permissions, to the example access request results in a denial of access to the computing resource; and generate a set of complete request contexts each comprising the first parameter and the corresponding first value, the second parameter and the corresponding second value, and the third parameter and a corresponding third value selected from the second set of parameter values.

5. A system, comprising one or more processors and memory storing computer-executable instructions that, when executed by the one or more processors, cause the system to:

receive information associated with a user account of a computing resource service provider, the information specifying a first security policy for controlling access to one or more computing resources provided by the computing resource service provider and associated with the user account;

obtain a first set of constraints corresponding to access grants of the first security policy;

obtain a second set of constraints corresponding to access denials of the first security policy;

generate a plurality of combinations of two or more constraints from one or both of the first set of constraints and the second set of constraints; and generate, based on the plurality of combinations, a plurality of request contexts each comprising unique corresponding values for a set of context parameters required by the first security policy, such that a simulation of applying the first security policy to a request for access to the one or more computing resources, the request comprising any of the plurality of request contexts, produces a result indicating whether the request is granted or denied.

6. The system of claim 5, wherein executing the instructions further causes the system to:
generate coverage information describing each of the plurality of combinations; and
provide, to a user associated with the user account via a user interface:
the coverage information; and
the plurality of request contexts.

7. The system of claim 5, wherein executing the instructions further causes the system to:
obtain a second security policy for controlling access to the one or more computing resources; and
identify, as a set of edge-case contexts, each request context of the plurality of request contexts that, when used in the request, causes the first security policy and the second security policy to produce, in response to the request, respective access decisions that are not equivalent.

8. The system of claim 7, wherein the first security policy comprises a modification of the second security policy, and executing the instructions further causes the system to:
determine whether the set of edge-case contexts includes one or more regressive contexts that, when used in the request, cause the first security policy to grant access to the one or more computing resources in response to the request, and cause the second security policy to deny access to the one or more computing resources in response to the request; and
responsive to a determination that the set of edge-case contexts includes one or more regressive contexts, provide, to a user associated with the user account via a user interface:
regression information indicating that the first security policy is at least partially more permissive than the second security policy; and
the one or more regressive contexts.

9. The system of claim 7, wherein the instructions, when executed, cause the system to:
obtain a first partial request context comprising a first value for a first parameter of the set of request context parameters, the first value satisfying the first set of constraints with respect to the first parameter;
generate the second security policy based on the first partial request context, the second security policy requiring a corresponding request context of an access request to have the first value for the first parameter in order to grant access to at least a first computing resource of the one or more computing resources in response to the access request.

10. The system of claim 7, wherein executing the instructions further causes the system to:
determine a first propositional logic expression based at least in part on a first set of security permissions encoded in the first security policy;
determine a second propositional logic expression based at least in part on a second set of security permissions encoded in the second security policy; and
to identify the set of edge-case contexts, identify a set of parameter values, associated with the set of request context parameters, that is sufficient to determine the first propositional logic and the second propositional logic lack equivalency such that applying the first security policy to the set of parameter values results in a denial of access to a first computing resource associated with the set of parameter values, and applying the second security policy to the set of parameter values results in a grant of access to the first computing resource.

11. The system of claim 10, wherein executing the instructions further causes the system to:
obtain a third set of constraints corresponding to access grants of the second security policy;
obtain a fourth set of constraints corresponding to access denials of the second security policy; and
to determine the first propositional logic and the second propositional logic lack equivalency, determine, using a satisfiability modulo theories (SMT) solver, whether the first, second, third, and fourth sets of constraints are satisfiable.

12. The system of claim 7, wherein executing the instructions further causes the system to:
obtain, based on the set of edge-case contexts, a partial request context comprising a first value for a first parameter of the set of request context parameters, the first value satisfying the first set of constraints with respect to the first parameter;
generate a third security policy based on the partial request context, the third security policy requiring a corresponding request context of an access request to have the first value for the first parameter in order to grant access to at least a first computing resource of the one or more computing resources in response to the access request; and
generate, in the set of edge-case contexts and based on the plurality of combinations, a plurality of additional request contexts each comprising unique corresponding values for the set of context parameters, the plurality of additional request contexts each, when used in the request, causing the first security policy and the third security policy to produce, in response to the request, respective access decisions that are not equivalent.

13. The system of claim 5, wherein to generate the plurality of request contexts, executing the instructions causes the system to:
access a data store storing usage data associated with the user account;
obtain, from the data store, request data describing previous requests to access the one or more computing devices; and
generate the plurality of request contexts based on the request data.

14. A system, comprising one or more processors and memory storing specific computer-readable program instructions that, when executed by the one or more processors, cause the system to:
receive, via a user interface, information associated with a user account of a computing resource service provider, the information specifying a first security policy for controlling access to one or more computing resources provided by the computing resource service provider and associated with the user account;
obtain a first set of constraints corresponding to access grants of the first security policy;
generate, based on a plurality of combinations of constraints in the first set of constraints, a plurality of request contexts each comprising unique corresponding values for a set of context parameters evaluated using the first security policy to determine whether to grant or deny a request for access to the one or more computing resources, the request comprising any of the plurality of request contexts; and provide, via the user interface, information describing the plurality of request contexts.

15. The system of claim 14, wherein executing the instructions further causes the system to:

generate a plurality of simulation results each associated with a corresponding request context of the plurality of request contexts, and each indicating whether a simulated request comprising the corresponding request context is granted or denied by the first security policy; and include the plurality of simulation results in the information describing the plurality of request contexts.

16. The system of claim 15, wherein executing the instructions further causes the system to:

provide, via the user interface with the information describing the plurality of request contexts, a prompt requesting an indication from the user whether each of the plurality of simulation results is a desired result for the corresponding request context;

receive user input entered into the user interface;

determine that the user input comprises a response to the prompt;

determine whether the response identifies one or more of the plurality of simulation results as inaccurate results;

responsive to a determination that the response does not identify one or more of the plurality of simulation results as inaccurate results, validate the first security policy; and responsive to a determination that the response identifies one or more inaccurate results, perform one or more actions associated with recommending modifications to the first security policy.

17. The system of claim 14, wherein executing the instructions further causes the system to:

determine that first security policy comprises a modification of a previous security policy;

obtain a second set of constraints corresponding to access grants of the previous security policy; and to generate the plurality of request contexts, determine, based on the first and second sets of constraints, one or more sets of values corresponding to the set of request context parameters, each of the one or more sets of values, when used in the request, causing the first security policy to grant access to the one or more computing resources in response to the request, and causing the previous security policy to deny access to the one or more computing resources in response to the request.

18. The system of claim 14, wherein executing the instructions further causes the system to include, in the information describing the plurality of request contexts, one or more of:

a first annotation to be displayed in the user interface, the first annotation indicating that a first element of a first parameter of the set of request context parameters has a custom value that can be changed by a requestor; and a second annotation to be displayed in the user interface, the second annotation indicating that a second element of the first parameter has a fixed value that is not modifiable by the requestor.

19. The system of claim 14, wherein executing the instructions further causes the system to:

receive via the user interface, user input associated with the first security policy;

determine that the user input comprises a request for a set of valid request contexts that each trigger one of the access grants of the first security policy; and generate, as the plurality of request contexts, the set of valid request contexts.

20. The system of claim 19, wherein executing the instructions further causes the system to:

determine that the user input further comprises a first value for a first parameter of the set of request context parameters; and include, in each valid request context of the set of valid request contexts, the first value as a fixed value for the first parameter.

* * * * *